United States Patent
Hayashi et al.

(10) Patent No.: US 9,290,656 B2
(45) Date of Patent: *Mar. 22, 2016

(54) POLYMERIZABLE COMPOSITION FOR POLYTHIOURETHANE OPTICAL MATERIAL

(75) Inventors: Hidetoshi Hayashi, Omuta (JP); Nobuo Kawato, Kurume (JP); Masanori Iwazumi, Omuta (JP); Mamoru Tanaka, Omuta (JP); Seiichi Kobayashi, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1202 days.

This patent is subject to a terminal disclaimer.

(21) Appl. No.: 12/280,300

(22) PCT Filed: Feb. 15, 2007

(86) PCT No.: PCT/JP2007/000088

§ 371 (c)(1),
(2), (4) Date: Aug. 21, 2008

(87) PCT Pub. No.: WO2007/097116

PCT Pub. Date: Aug. 30, 2007

(65) Prior Publication Data

US 2011/0190466 A1 Aug. 4, 2011

(30) Foreign Application Priority Data

Feb. 21, 2006 (JP) .................................. 2006-044214
Feb. 28, 2006 (JP) .................................. 2006-053665
Aug. 24, 2006 (JP) .................................. 2006-227522

(51) Int. Cl.
C08G 18/38 (2006.01)
C08L 75/04 (2006.01)
C08G 18/22 (2006.01)
C08G 18/75 (2006.01)
C08G 18/76 (2006.01)
G02B 1/04 (2006.01)
G11B 7/2533 (2013.01)

(52) U.S. Cl.
CPC .............. C08L 75/04 (2013.01); C08G 18/222 (2013.01); C08G 18/3876 (2013.01); C08G 18/757 (2013.01); C08G 18/7642 (2013.01); G02B 1/041 (2013.01); G11B 7/2533 (2013.01)

(58) Field of Classification Search
CPC .................................................. C08G 18/3876
USPC ......................................................... 528/65
See application file for complete search history.

(56) References Cited

U.S. PATENT DOCUMENTS 3,182,037 A * 5/1965 Nelson ........................ 524/202
4,119,613 A * 10/1978 Reischl et al. ................ 526/64
4,748,242 A * 5/1988 Halpaap et al. .............. 544/222
5,270,389 A * 12/1993 Clouet .......................... 525/123
5,401,823 A 3/1995 Huemke et al.
5,594,088 A * 1/1997 Nagata et al. ................... 528/77
5,610,260 A * 3/1997 Schmalstieg et al. ........... 528/49
5,718,817 A * 2/1998 Bossert et al. ................ 204/501
5,747,628 A * 5/1998 Schmalstieg et al. ........... 528/60
5,998,532 A * 12/1999 Urs ............................... 524/507
2003/0181625 A1* 9/2003 Klinkenberg et al. ......... 528/48
2003/0212164 A1* 11/2003 Klinkenberg et al. ........ 522/173
2004/0026658 A1* 2/2004 Yoshimura et al. ...... 252/183.11
2004/0147626 A1 7/2004 Hohl et al.
2007/0142605 A1* 6/2007 Bojkova et al. ................ 528/44
2007/0142606 A1* 6/2007 Bojkova et al. ................ 528/44
2008/0097045 A1* 4/2008 Isahaya et al. ................ 525/457
2008/0300338 A1* 12/2008 Wagner et al. ................ 522/107

(Continued)

FOREIGN PATENT DOCUMENTS

JP 4-58489 B2 9/1992
JP 6-9745 A 1/1994

(Continued)

OTHER PUBLICATIONS

Applied Technique for Latest Polyurethane, CMC Publishing Co., Ltd., 1983, pp. 27-31 with English language Relevant Information.

(Continued)

Primary Examiner — Liam J Heincer
(74) Attorney, Agent, or Firm — Buchanan, Ingersoll & Rooney PC

(57) ABSTRACT

A polymerizable composition for polythiourethane optical materials comprising a compound represented by the general formula (1), $$M(L)n \qquad (1)$$

wherein, in the formula, M is Al, Fe, Cu, Zn, Zr or Bi; L is a dithiocarbamic acid group, a sulfonic acid group, a mono- or di-alkyl phosphoric acid ester group, a substituted acetylacetonato group or a halogen; and n is an integer of 1 to 5, one or two or more isocyanates selected from the group consisting of isocyanate compounds and isothiocyanate compounds, and one or two or more active hydrogen compounds each having a mercapto group. The compounds represented by the general formula (1) exhibit catalytic activity equal to or superior to that of organotin catalysts having been employed as catalysts for the production of polythiourethane optical materials from the past, and have high safety. Further, the thus obtained polythiourethane resins satisfactorily meet the property requirements for optical materials, in particular, excelling in weather resistance. Therefore, the proposed catalysts are available as novel catalysts replacing the organotin catalysts.

27 Claims, 1 Drawing Sheet

(56) References Cited

U.S. PATENT DOCUMENTS

| | | | |
|---|---|---|---|
| 2009/0029153 A1* | 1/2009 | Naito et al. | 428/328 |
| 2010/0016517 A1* | 1/2010 | Iwazumi et al. | 525/452 |
| 2010/0029890 A1* | 2/2010 | Kawato et al. | 528/53 |
| 2010/0075154 A1* | 3/2010 | Hayashi et al. | 428/425.9 |
| 2010/0234498 A1* | 9/2010 | Iwazumi et al. | 524/147 |
| 2011/0112269 A1* | 5/2011 | Iwazumi et al. | 528/71 |

FOREIGN PATENT DOCUMENTS

| | | |
|---|---|---|
| JP | 10-101759 A | 4/1998 |
| JP | 11-236427 A | 8/1999 |
| JP | 2001-64504 A | 3/2001 |
| JP | 3220614 B2 | 10/2001 |
| JP | 2001-342235 A | 12/2001 |
| JP | 2002-82203 A | 3/2002 |
| JP | 2003-315501 A | 11/2003 |
| JP | 2004-508427 A | 3/2004 |
| JP | 2004-231962 A | 8/2004 |
| JP | 2004-269673 A | 9/2004 |
| JP | 2004-277621 A | 10/2004 |
| JP | 2005-105084 A | 4/2005 |
| JP | 2005-105085 A | 4/2005 |
| JP | 2006-265408 A | 10/2006 |
| JP | 2006-299217 A | 11/2006 |
| WO | WO 2006/001341 A1 | 1/2006 |

OTHER PUBLICATIONS

International Search Report (PCT/ISA/210).

* cited by examiner

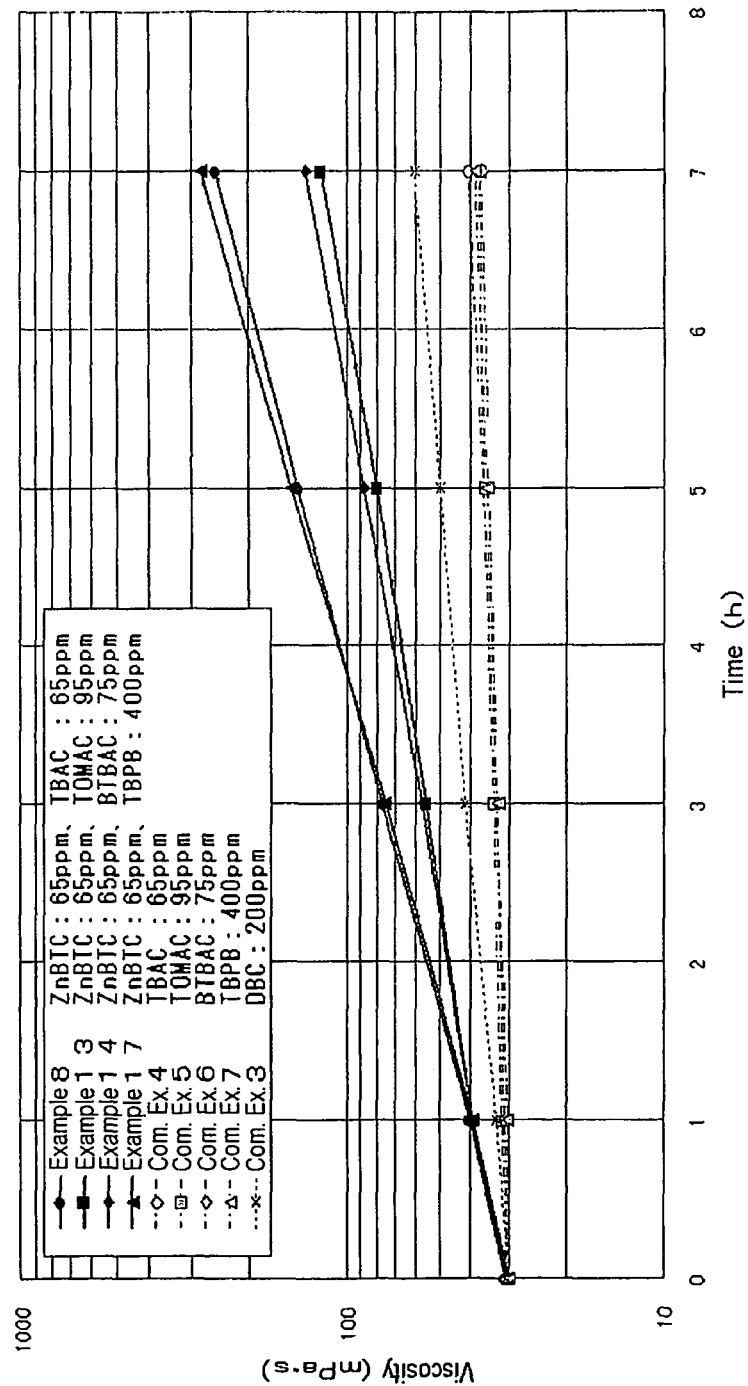

POLYMERIZABLE COMPOSITION FOR POLYTHIOURETHANE OPTICAL MATERIAL

TECHNICAL FIELD

The present invention relates to a catalyst for the polythiourethanization reaction. More specifically, the invention relates to a catalyst having higher safety and exhibiting higher catalytic activity than those of an organic tin catalyst that has been widely used as a catalyst for the polythiourethanization reaction from the past, and a polythiourethane optical material produced by using the catalyst.

BACKGROUND ART

In recent years, harmony with the global environment and decrease of the environmental load become objects in the manufacturing industry. Development of products or technologies in consideration of the environment has been speeded up. Due to a change in the external environment, even in the chemical industry, the use of compounds or heavy metal compounds with high toxicity has been independently suppressed, while there has been a movement to develop alternative technologies.

There has also been such a movement in the polyurethane industry belonging to the technical field of the present invention, and, in particular, the regulation on the use of organic tin catalyst that have been widely used as catalysts for the production of polyurethane has been strengthened in developed countries taking the lead in this movement. Therefore, development of alternative catalysts has also been actively made.

When polyurethane or polythiourethane is produced by the reaction of an isocyanate compound with an active hydrogen compound having a hydroxyl group or a mercapto group, a tertiary amine type catalyst or an organic metal type catalyst has been mainly used as a reaction catalyst. As the tertiary amine type catalyst, there have been used compounds such as triethylenediamine, N,N-dimethylethanolamine, triethylamine, N-ethylmorpholine and the like. As the organic metal type catalyst, there have been used organotin catalysts such as dibutyltin dichloride (DBC), dibutyltin dilaurate (DBTDL), dibutyltin diacetate and the like; organic acid salts and acetylacetonate complex compounds such as iron, nickel, zinc and the like. When both types of catalysts are compared, organic metal type catalysts generally have high activity, and the frequency of their use is high (Non-patent Document 1) from the viewpoint of reactivity. Furthermore, polyurethane or polythiourethane resins that have been produced by using these known catalysts have been used in various fields. Of such resins, a transparent resin made of polythiourethane belonging to the technical field of the present invention has been widely used as a plastic lens material (Patent Document 1). Since a plastic lens is lightweight and hardly broken as compared to an inorganic lens that has been used from the past, and can be tinted, in late years, it has quickly come into wide use as an optical material of spectacle lenses, camera lenses and the like.

As a catalyst to be used at the time of the production reaction of these polythiourethane resins which serve as useful optical materials, there have been widely used organotin catalysts including typical examples of DBC or DBTDL from the past from the viewpoint of high catalytic activity. However, as mentioned in the beginning, there has, in late years, been pointed out a problem in these organotin catalysts from the viewpoint of toxicity.

For example, tributyltin contained in DBTDL as impurities and tributyltin chloride contained in DBC as impurities have a problem of the risk of injury to the human body as endocrine disruptors. Furthermore, there has already been a movement of controlling use of an organic tin compound in Europe taking the lead in this movement. Therefore, in the business world of spectacle lenses using polythiourethane resins, it has been urgently desired to develop a tin substituted catalyst. From now on, not only in Europe but also throughout the world, it is highly possible that the regulation on the use of organic tin compound is still more strengthened, while, in the polyurethane industry, it becomes essential to develop a catalyst with high safety and high activity which can be a substitute of an organic tin compound.

For example, as alternatives of organic tin catalyst in the polyurethane field, there have been known a catalyst composed of a carboxylic acid metal compound and a quaternary ammonium salt compound (Patent Document 2), a catalyst composed of a two-ring tertiary amine compound and a quaternary ammonium salt compound (Patent Document 3), a metal catalyst of titanium and aluminum having an alkoxy group or a carboxy group in a ligand (Patent Document 4) and the like. These catalysts are mainly used as catalysts for the production of polyurethane resins produced from polyisocyanates and polyols. There is no case in which these catalysts are used as catalysts of polythiourethane optical materials produced from polyisocyanates and polythiols. In the field of the present invention, that is, the field of sulfur-containing plastic lenses, there has been reported a case in which dithiocarbamic acid salts of metals have been used for catalysts (Patent Document 5). However, there has not been reported a tin free catalyst which can be used for the production of polythiourethane resins that have come into wide use as materials for plastic lenses.

To produce a polythiourethane resin as a material for a plastic lens, a casting polymerization method in which a polymerizable composition is generally injected into a mold for heat curing can be taken, whereas the polymerization reaction is carried out while gradually raising the temperature from low temperature to high temperature over several hours to several tens of hours. At that time, in order to obtain an optically homogeneous plastic lens, adding a catalyst is required to slowly carry out the polythiourethanization reaction controlled by heat lest thermal inhomogeneity be occurred while raising the temperature. Furthermore, in order to achieve full resin properties including optical properties, heat resistance and strength, it is necessary to complete the polymerization. In order to complete the polymerization, a method in which a catalyst with strong polymerization activity is used or an amount of the catalyst is increased can be cited. However, such a method has a problem such that the polymerization reaction has all been progressed while the prepared polymerizable composition is injected into a mold, that is, a sufficient pot life cannot be secured. Further, there is also a problem such that during the polymerization, exothermic heat is locally generated so that optical inhomogeneity is easily exhibited to lenses. As a method to solve this problem, for example, there has been reported a case in which the low-temperature activity is suppressed by using Lewis acid for a tertiary amine with strong activity together (Patent Document 6).

Patent Document 1: Japanese Patent Publication No. 1992-58489
Patent Document 2: Japanese Patent Laid-open No. 2005-105084
Patent Document 3: Japanese Patent Laid-open No. 2005-105085

Patent Document 4: Japanese Patent Laid-open No. 2004-277621
Patent Document 5: Japanese Patent Laid-open No. 2004-269673
Patent Document 6: Japanese Patent No. 3220614
Non-patent Document 1: [Applied Technique for Latest Polyurethane] published by CMC Publishing Co., Ltd. in 1983, p. 27 to 31

DISCLOSURE OF THE INVENTION

The present invention is to provide a tin free catalyst having excellent catalytic activity in place of an organotin catalyst that has been used as a catalyst for the production of polythiourethane optical materials from the past.

That is, the present invention is specified by matters described in below:

[1] a polymerizable composition for polythiourethane optical materials containing a compound represented by the general formula (1), one or two or more isocyanates selected from the group consisting of isocyanate compounds and isothiocyanate compounds, and one or two or more active hydrogen compounds each having a mercapto group,

$$M(L)n \quad (1)$$

wherein, in the formula, M represents Al, Fe, Cu, Zn, Zr or Bi; L represents a dithiocarbamic acid group, a sulfonic acid group, a mono- or di-alkyl phosphoric acid ester group, a substituted acetylacetonato group or a halogen; and n represents an integer of 1 to 5;

[2] the polymerizable composition for polythiourethane optical materials as set forth in [1], further containing a compound represented by the general formula (2),

wherein, in the formula, $R^1$, $R^2$, $R^3$ and $R^4$ each independently represent hydrogen, monovalent or higher valent linear aliphatic, cyclic aliphatic or aromatic organic residues; $R^1$, $R^2$, $R^3$ and $R^4$ may be bonded with each other to form a ring; X represents an organic acid group or an inorganic acid group; and Y represents nitrogen or a phosphorus atom;

[3] the polymerizable composition for polythiourethane optical materials as set forth in [2], wherein, in the general formula (2), $R^1$, $R^2$, $R^3$ and $R^4$ are each independently any one selected from the group consisting of an alkyl group having 1 to 18 carbon atoms, a hydroxyalkyl group having 1 to 18 carbon atoms, a phenyl group, a phenylalkyl group having 7 to 18 carbon atoms or an aminoalkyl group having 1 to 18 carbon atoms;

[4] the polymerizable composition for polythiourethane optical materials as set forth in [2] or [3], wherein the compound of the general formula (2) is one or two or more kinds selected from the group consisting of a tetramethylammonium salt, a tetraethylammonium salt, a tetrapropylammonium salt, a tetrabutylammonium salt, a trioctylmethylammonium salt, a tributylbenzylammonium salt and a tetrabutylphosphonium salt;

[5] the polymerizable composition for polythiourethane optical materials as set forth in [4], wherein the compound of the general formula (2) is one or two or more kinds selected from the group consisting of tetrabutylammonium chloride, tetrabutylammonium bromide, tetraethylammonium bromide, tetrabutylammonium tetrafluoroborate, trioctylmethylammonium chloride, tributylbenzylammonium chloride and tetrabutylphosphonium bromide;

[6] the polymerizable composition for polythiourethane optical materials as set forth in any one of [1] to [5], wherein M in the general formula (1) is Zn or Fe;

[7] the polymerizable composition for polythiourethane optical materials as set forth in any one of [1] to [6], wherein L in the general formula (1) is a group represented by the general formula (3),

wherein, in the formula, $R^5$ and $R^6$ each represent an alkyl group having 1 to 10 carbon atoms, a phenylalkyl group having 7 to 10 carbon atoms or an aryl group having 6 to 10 carbon atoms, and may be the same or different; and $R^5$ and $R^6$ may be bonded with each other to form a ring;

[8] the polymerizable composition for polythiourethane optical materials as set forth in any one of [1] to [7], wherein the compound represented by the general formula (1) is one or two or more kinds selected from the group consisting of zinc dimethyldithiocarbamate acid, zinc diethyldithiocarbamate and zinc di-n-butyldithiocarbamate;

[9] the polymerizable composition for polythiourethane optical materials as set forth in any one of [2] to [8], wherein the molar ratio of the compound of the general formula (2) to the compound of the general formula (1) is not less than 0.01 but not more than 100;

[10] the polymerizable composition for polythiourethane optical materials as set forth in any one of [1] to [9], wherein the isocyanates is an isocyanate compound;

[11] the polymerizable composition for polythiourethane optical materials as set forth in [10], wherein the isocyanate compound is one or two or more kinds selected from the group consisting of m-xylylene diisocyanate, 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane and hexamethylene diisocyanate, and the active hydrogen compound is one or two or more kinds selected from the group consisting of 4-mercaptomethyl-1,8-dimercapto-3,6-dithiaoctane, 5,7-dimercaptomethyl-1,1'-dimercapto-3,6,9-trithiaundecane, 4,7-dimercaptomethyl-1,1'-dimercapto-3,6,9-trithiaundecane, 4,8-dimercaptomethyl-1,1'-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2, 2-bis(mercaptomethylthio)ethyl)-1,3-dithietane;

[12] a polythiourethane optical material obtained by curing the polymerizable composition for polythiourethane optical materials as set forth in any one of [1] to [11];

[13] a plastic lens composed of the polythiourethane optical material as set forth in [12];

[14] a process for producing the polythiourethane optical material, wherein the polymerizable composition for polythiourethane optical materials as set forth in any one of [1] to [11] is subjected to casting polymerization; and

[15] a process for producing the polythiourethane optical material as set forth in any one of [2] to [11], wherein the total amount of the compound of the general formula (1) and the compound of the general formula (2) is not less than 0.0005 weight parts but not more than 5 weight parts based on the total 100 weight parts of the isocyanates and the active hydrogen compounds, and the compound of the general formula (1) is mixed with the compound of the general formula (2).

In Patent Document 5, there has been disclosed a part of the compound represented by the general formula (1) of the present invention as a catalyst in the production of sulfur-containing plastic lenses. However, Patent Document 5 relates to the use of an episulfide type lens composed of an inorganic sulfur compound and an episulfide compound, whereas the present invention relates to the use of it as a catalyst for the production of polythiourethane optical material obtained from isocyanates and active hydrogen compounds each having a mercapto group. Furthermore, the present invention achieves catalytic activity equal to or superior to that of an organotin catalyst by using the compound represented by the general formula (1). Furthermore, the effect of improvement of weather resistance of the obtained polythiourethane resin has been found. Due to the improvement of weather resistance, it is possible to control the deterioration of color hue in the lens that has been a problem when the lens is used for a long time as a plastic lens.

Accordingly, the catalyst of the present invention is a tin free catalyst having excellent catalytic activity replacing the organotin catalyst that has been used as a catalyst for the production of polythiourethane optical materials from the past. In recent years, it is possible to use the tin free catalyst as a novel catalyst replacing the organotin catalyst. The control of use of the organotin catalyst has been strengthened. The polythiourethane resin obtained by the catalyst of the present invention satisfactorily meet the property requirements for optical materials, in particular, excelling in weather resistance as compared to that obtained by the organotin catalyst. Furthermore, by using the compound represented by the general formula (2) together, the catalytic activity of the compound represented by the general formula (1) is rapidly improved. Thus, the catalytic activity per unit mole of the compound is more excellent than that of the organotin catalyst. Accordingly, the amount of the catalyst added is small so that the amount of the compound other than the polythiourethane compound exhibiting physical properties by nature can be made small.

The polythiourethane optical materials of the present invention obtained by using the aforementioned polymerizable composition for polythiourethane optical materials are used for optical materials of plastic lenses, prisms, optical fibers, information recording substrates, filters, light emitting diodes or the like, and particularly suitably used as plastic lens materials for spectacles.

BRIEF DESCRIPTION OF THE DRAWINGS

The aforementioned objects and other objects, characteristics and advantages become further clear by the appropriate embodiments to be described below and the following drawings accompanied thereto.

FIG. 1 is a graph illustrating the time course of the viscosity of the polymerizable composition in Examples and Comparative Examples.

BEST MODE FOR CARRYING OUT THE INVENTION

The present invention will be illustrated in detail below.

The present invention relates to a polymerizable composition for polythiourethane optical materials containing a compound represented by the general formula (1), one or two or more isocyanates selected from the group consisting of isocyanate compounds and isothiocyanate compounds, and one or two or more active hydrogen compounds each having a mercapto group, $$M(L)n \quad (1)$$

wherein, in the formula, M represents Al, Fe, Cu, Zn, Zr or Bi; L represents a dithiocarbamic acid group, a sulfonic acid group, a mono- or di-alkyl phosphoric acid ester group, a substituted acetylacetonato group or a halogen; and n represents an integer of 1 to 5. The present inventors have found that the compound represented by the general formula (1) has excellent catalytic activity equal to or superior to that of the organotin catalyst that has been used as a catalyst for the production of polythiourethane optical materials produced from isocyanates and the active hydrogen compounds each having a mercapto group.

Furthermore, the present invention relates to a polymerizable composition for polythiourethane optical materials further containing a compound represented by the general formula (2),

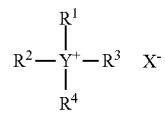

(2)

wherein, in the formula, $R^1$, $R^2$, $R^3$ and $R^4$ each independently represent hydrogen, monovalent or higher valent linear aliphatic, cyclic aliphatic or aromatic organic residues; $R^1$, $R^2$, $R^3$ and $R^4$ may be bonded with each other to form a ring; X represents an organic acid group or an inorganic acid group; and Y represents nitrogen or a phosphorus atom. The present inventors have found that the catalytic activity of the general formula (1) is rapidly improved by using the compound represented by the general formula (1) and the compound represented by the general formula (2) together, and the polythiourethane resin obtained by curing the polymerizable composition with much less amount of the catalyst added satisfactorily meet the property requirements for optical materials.

M in the compound represented by the general formula (1) represents a metal, and represents Al, Fe, Cu, Zn, Zr or Bi. M is preferably Al, Fe, Zr or Zn and further preferably Zn or Fe.

In the compound represented by the general formula (1), L represents a dithiocarbamic acid group, a sulfonic acid group, a mono- or di-alkyl phosphoric acid ester group, a substituted acetylacetonato group or a halogen. L is preferably a dithiocarbamic acid group, a substituted acetylacetonato group or a halogen and further preferably a dithiocarbamic acid group.

As the dithiocarbamic acid group, L of a group represented by the general formula (3) is a more preferred embodiment,

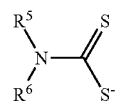

(3)

wherein, in the group represented by the general formula (3), $R^5$ and $R^6$ each represent an alkyl group having 1 to 10 carbon atoms, a phenylalkyl group having 7 to 10 carbon atoms or an aryl group having 6 to 10 carbon atoms, and may be the same or different; and $R^5$ and $R^6$ may be bonded with each other to form a ring.

Herein, concrete examples of the alkyl group having 1 to 10 carbon atoms include alkyl groups such as a methyl group, an ethyl group, a propyl group, a butyl group, a pentyl group, a hexyl group, a heptyl group, an octyl group, a nonyl group, a decyl group and the like. Concrete examples of the phenylalkyl group having 7 to 10 carbon atoms include a benzyl group, a phenylethyl group, a phenylpropyl group and a phenylbutyl group. Concrete examples of the aryl group having 6 to 10 carbon atoms include aryl groups such as a phenyl group, a tolyl group, a xylyl group, a mesityl group, a naphthyl group and the like. However, $R^5$ and $R^6$ are not restricted to these exemplified compounds. Furthermore, $R^5$ and $R^6$ may be bonded with each other to form a pyrrolidine ring or a piperidine ring.

Examples of the group represented by the general formula (3) include dithiocarbamic acid groups of the following dithiocarbamic acids, but are not restricted to these exemplified compounds. Concrete examples thereof include dithiocarbamic acids such as N,N-dimethyldithiocarbamic acid, N,N-diethyldithiocarbamic acid, N,N-dipropyldithiocarbamic acid, N,N-dibutyldithiocarbamic acid, N-ethyl-N-phenyldithiocarbamic acid, N,N-dibenzyldithiocarbamic acid and the like, and derivatives thereof.

Examples of the sulfonic acid group include sulfonic acid groups of the following sulfonic acids, but are not restricted to these exemplified compounds. Concrete examples thereof include sulfonic acids such as methanesulfonic acid, ethanesulfonic acid, propanesulfonic acid, butanesulfonic acid, pentanesulfonic acid, hexanesulfonic acid, heptanesulfonic acid, octanesulfonic acid, nonanesulfonic acid, decanesulfonic acid, undecanesulfonic acid, dodecanesulfonic acid, tetradecanesulfonic acid, hexadecanesulfonic acid, benzenesulfonic acid, toluenesulfonic acid, dodecylbenzenesulfonic acid, trifluoromethanesulfonic acid, fluorosulfonic acid and the like, and derivatives thereof.

Examples of an ester alkyl group of the mono- or di-alkyl phosphoric acid ester group include the following alkyl groups, but are not restricted to thereto. Concrete examples thereof include alkyl groups such as a methyl group, an ethyl group, a propyl group, a butyl group, a dipentyl group, a hexyl group, a heptyl group, an octyl group, a decyl group, a dodecyl group, a tetradecyl group, a dihexadecyl group and the like; oxyethylene groups such as a methoxyethyl group, an ethoxyethyl group, a propoxyethyl group, a butoxyethyl group and the like; and polyoxyethylene groups. Ester alkyl groups of dialkyl phosphoric acid ester may be the same or different.

Examples of the substituted acetylacetonato group include 2,2,6,6-tetramethyl-3,5-heptanedionato groups, but are not restricted thereto.

Examples of halogen include fluorine, chlorine, bromine and iodine.

When one or two or more isocyanates selected from the group consisting of isocyanate compounds and isothiocyanate compounds are reacted with one or two or more active hydrogen compounds each having a mercapto group to produce polythiourethane optical materials, preferred examples of the aforementioned compound represented by the general formula (1) include iron dialkyldithiocarbamate, copper dialkyldithiocarbamate, zinc dialkyldithiocarbamate, zinc alkyl phenyl dithiocarbamate, zinc diaryldithiocarbamate, iron acetylacetonato, copper acetylacetonato and zinc acetylacetonato, and further preferably zinc N,N-dimethyldithiocarbamate, zinc N,N-diethyldithiocarbamate, zinc N,N-di-n-butyldithiocarbamate, zinc N-ethyl-N-phenyldithiocarbamate and zinc N,N-dibenzyldithiocarbamate. These compounds of the general formula (1) can be used singly, or two or more compounds can be used in combination.

Furthermore, in view of the solubility into a monomer of isocyanates, active hydrogen compounds and the like or resin properties that are required as a plastic spectacle lens of the generated resin, among the foregoing compounds, particularly preferred are zinc N,N-dimethyldithiocarbamate, zinc N,N-diethyldithiocarbamate and zinc N,N-di-n-butyldithiocarbamate. When these compounds are used as catalysts, weather resistance of resin properties of the polythiourethane optical material is particularly improved. Due to the improvement of weather resistance, it is possible to provide a plastic lens in which the deterioration of color hue is suppressed when the lens is used for a long time.

The compound represented by the general formula (1) can be contained in the polymerizable composition for polythiourethane optical materials without using tertiary amine having strong activity with much less amount of the compound added than that of the conventional organotin catalyst. The polythiourethane resin obtained by curing the polymerizable composition satisfactorily meets the property requirements for optical materials. Furthermore, a sufficient pot life can be secured until the composition is injected into a mold, and weather resistance of the obtained resin is particularly excellent. Therefore, the catalyst can be available as a novel catalyst replacing the organotin catalyst.

Examples of $R^1$, $R^2$, $R^3$ and $R^4$ in the compound represented by the general formula (2) include hydrogen or monovalent or higher valent organic residues derived from linear aliphatic compounds such as methane, ethane, propane, butane, pentane, hexane, heptane, octane, nonane, decane, undecane, dodecane, tetradecane, hexadecane, octadecane, ethylene, propylene, 1-butene, 2-butene, butadiene and the like;

monovalent or higher valent organic residues derived from cyclic aliphatic compounds such as cyclopentane, cyclopentene, cyclopentadiene, cyclohexane, 1,2-dimethylcyclohexane, 1,3-dimethylcyclohexane, 1,4-dimethylcyclohexane, cyclohexene, 1,3-cyclohexadiene, 1,4-cyclohexadiene, norbornane, 2,3-dimethylnorbornane, 2,5-dimethylnorbornane, 2,6-dimethylnorbornane, bis(4-methylcyclohexyl)methane and the like;

monovalent or higher valent organic residues derived from aromatic compounds such as benzene, toluene, o-xylene, m-xylene, p-xylene, naphthalene, biphenyl, anthracene, perylene, styrene, ethylbenzene and the like;

monovalent or higher valent organic residues derived from alcohol compounds such as methanol, ethanol, propanol, isopropanol, butanol, isobutanol, pentanol, hexanol, heptanol, octanol, nonanol, decanol, undecanol, dodecanol and the like;

monovalent or higher valent organic residues derived from primary amine compounds such as ethylamine, n-propylamine, isopropylamine, n-butylamine, sec-butylamine, ter-butylamine, pentylamine, hexylamine, heptylamine, octylamine, decylamine, laurylamine, myristylamine, 3-pentylamine, 2-ethylhexylamine, 1,2-dimethylhexylamine and the like;

monovalent or higher valent organic residues derived from secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine and the like; and monovalent or higher valent organic residues derived from tertiary amine compounds such as triethylamine, tri n-butylamine, tri n-hexylamine, N,N-diisopropylethylamine, triethylene diamine, triphenylamine, N,N-dimethylethanolamine, N,N-diethylethanolamine, N,N-dibutylethanolamine, triethanolamine, N-ethyldiethanolamine, N,N-dimethylbenzylamine, N,N-diethylbenzylamine, tribenzylamine, N-methyldibenzylamine and the like, but are not restricted only to these exemplified compounds. Furthermore, $R^1$, $R^2$, $R^3$ and $R^4$ may be bonded with each other to form a ring.

Furthermore, it is more preferable that the aforementioned $R^1$, $R^2$, $R^3$ and $R^4$ are each independently an alkyl group having 1 to 18 carbon atoms, a hydroxyalkyl group having 1 to 18 carbon atoms or an aminoalkyl group having 1 to 18 carbon atoms.

Examples of X in the general formula (2) include organic acid groups derived from organic acids such as formic acid, acetic acid, propionic acid, butanoic acid, 2-ethylhexanoic acid, oxalic acid, tartaric acid, succinic acid, fumaric acid, maleic acid, lactic acid, benzoic acid, citric acid, benzenesulfonic acid, toluenesulfonic acid, methanesulfonic acid, phosphoric ester, tetraphenyl boron and the like, and derivatives thereof; and inorganic acid groups derived from inorganic acids such as hydrohalogen acid, perchloric acid, carbonic acid, hydrocarbonic acid, sulfuric acid, phosphoric acid, boric acid and the like, but are not restricted only to these exemplified compounds.

When Y in the general formula (2) is a nitrogen atom, concrete examples of the compound of the general formula (2) include quaternary ammonium salt compounds each having an alkyl group such as tetramethylammonium chloride, tetraethylammonium chloride, tetrapropylammonium chloride, tetrabutylammonium chloride, tetrahexylammonium chloride, tetraoctylammonium chloride, trimethyloctylammonium chloride, trimethylphenylammonium chloride, trimethylbenzylammonium chloride, triethyl-n-octylammonium chloride, triethylbenzylammonium chloride, tri-n-butyl-n-octylammonium chloride, tri-n-butylbenzylammonium chloride, methyl triphenylammonium chloride, ethyl triphenylammonium chloride, n-butyl triphenylammonium chloride, trimethylcetylammonium chloride, trimethylstearylammonium chloride, dimethylethylcetylammonium chloride, dimethyl didecylammonium chloride, dimethyl di-n-dodecylammonium chloride, dimethyl distearylammonium chloride, n-octyl dimethylbenzylammonium chloride, n-dodecyl dimethylbenzylammonium chloride, stearyl dimethylbenzylammonium chloride, triethyl-n-dodecylammonium chloride, tri-n-hexylmethylammonium chloride, tri-n-octylmethylammonium chloride, tri-n-decylmethylammonium chloride, tri-n-dodecylmethylammonium chloride, tri-n-octyl-n-dodecylammonium chloride, diethyl dicyclohexylammonium chloride, 1-methylpyridinium chloride, 1-ethylpyridinium chloride, 1-n-butylpyridinium chloride, 1-n-hexylpyridinium chloride, 1-n-octylpyridinium chloride, 1-n-dodecylpyridinium chloride, 1-phenylpyridinium chloride, 1-methyl-4-methylpyridinium chloride, 1-ethyl-4-methylpyridinium chloride, 1-n-butyl-4-methylpyridinium chloride, 1-n-hexyl-4-methylpyridinium chloride, 1-n-octyl-4-methylpyridinium chloride, 1-n-dodecyl-4-methylpyridinium chloride, 1-phenyl-4-methylpyridinium chloride, tetramethylammonium bromide, tetraethylammonium bromide, tetrapropylammonium bromide, tetrabutylammonium bromide, tetrahexylammonium bromide, tetraoctylammonium bromide, trimethyloctylammonium bromide, trimethylphenylammonium bromide, trimethylbenzylammonium bromide, triethyl-n-octylammonium bromide, triethylbenzylammonium bromide, tri-n-butyl-n-octylammonium bromide, tri-n-butylbenzylammonium bromide, methyl triphenylammonium bromide, ethyl triphenylammonium bromide, n-butyl triphenylammonium bromide, trimethylcetylammonium bromide, trimethylstearylammonium bromide, dimethylethylcetylammonium bromide, dimethyl didecylammonium bromide, dimethyl di-n-dodecylammonium bromide, dimethyl distearylammonium bromide, n-octyl dimethyl benzylammonium bromide, n-dodecyl dimethyl benzylammonium bromide, stearyl dimethyl benzylammonium bromide, triethyl-n-dodecylammonium bromide, tri-n-hexylmethylammonium bromide, tri-n-octylmethylammonium bromide, tri-n-decylmethylammonium bromide, tri-n-dodecylmethylammonium bromide, tri-n-octyl-n-dodecylammonium bromide, diethyl dicyclohexylammonium bromide, 1-methylpyridinium bromide, 1-ethylpyridinium bromide, 1-n-butylpyridinium bromide, 1-n-hexylpyridinium bromide, 1-n-octylpyridinium bromide, 1-n-dodecylpyridinium bromide, 1-phenylpyridinium bromide, 1-methyl-4-methylpyridinium bromide, 1-ethyl-4-methylpyridinium bromide, 1-n-butyl-4-methylpyridinium bromide, 1-n-hexyl-4-methylpyridinium bromide, 1-n-octyl-4-methylpyridinium bromide, 1-n-dodecyl-4-methylpyridinium bromide, 1-phenyl-4-methylpyridinium bromide, tetramethylammonium fluoride, tetraethylammonium fluoride, tetrapropylammonium fluoride, tetrabutylammonium fluoride, tetrahexylammonium fluoride, tetraoctylammonium fluoride, trimethyloctylammonium fluoride, trimethylphenylammonium fluoride, trimethylbenzylammonium fluoride, triethyl-n-octylammonium fluoride, triethylbenzylammonium fluoride, tri-n-butyl-n-octylammonium fluoride, tri-n-butylbenzylammonium fluoride, methyl triphenylammonium fluoride, ethyl triphenylammonium fluoride, n-butyl triphenylammonium fluoride, trimethylcetylammonium fluoride, trimethylstearylammonium fluoride, dimethylethylcetylammonium fluoride, dimethyl didecylammonium fluoride, dimethyl di-n-dodecylammonium fluoride, dimethyl distearylammonium fluoride, n-octyl dimethyl benzylammonium fluoride, n-dodecyl dimethyl benzylammonium fluoride, stearyl dimethyl benzylammonium fluoride, triethyl-n-dodecylammonium fluoride, tri-n-hexylmethylammonium fluoride, tri-n-octylmethylammonium fluoride, tri-n-decylmethylammonium fluoride, tri-n-dodecylmethylammonium fluoride, tri-n-octyl-n-dodecylammonium fluoride, diethyl dicyclohexylammonium fluoride, 1-methylpyridinium fluoride, 1-ethylpyridinium fluoride, 1-n-butylpyridinium fluoride, 1-n-hexylpyridinium fluoride, 1-n-octylpyridinium fluoride, 1-n-dodecylpyridinium fluoride, 1-phenylpyridinium fluoride, 1-methyl-4-methylpyridinium fluoride, 1-ethyl-4-methylpyridinium fluoride, 1-n-butyl-4-methylpyridinium fluoride, 1-n-hexyl-4-methylpyridinium fluoride, 1-n-octyl-4-methylpyridinium fluoride, 1-n-dodecyl-4-methylpyridinium fluoride, 1-phenyl-4-methylpyridinium fluoride, tetramethylammonium iodide, tetraethylammonium iodide, tetrapropylammonium iodide, tetrabutylammonium iodide, tetrahexylammonium iodide, tetraoctylammonium iodide, trimethyloctylammonium iodide, trimethylphenylammonium iodide, trimethylbenzylammonium iodide, triethyl-n-octylammonium iodide, triethylbenzylammonium iodide, tri-n-butyl-n-octylammonium iodide, tri-n-butylbenzylammonium iodide, methyl triphenylammonium iodide, ethyl triphenylammonium iodide, n-butyl triphenylammonium iodide, trimethylcetylammonium iodide, trimethylstearylammonium iodide, dimethylethylcetylammonium iodide, dimethyl didecylammonium iodide, dimethyl di-n-dodecylammonium iodide, dimethyl distearylammonium iodide, n-octyl dimethyl benzylammonium iodide, n-dodecyl dimethyl benzylammonium iodide, stearyl dimethyl benzylammonium iodide, triethyl-n-dodecylammonium iodide, tri-n-hexylmethylammonium iodide, tri-n-octylmethylammonium iodide, tri-n-decylmethylammonium iodide, tri-n-dodecylmethylammonium iodide, tri-n-octyl-n-dodecylammonium iodide, diethyl dicyclohexylammonium iodide, 1-methylpyridinium iodide, 1-ethylpyridinium iodide, 1-n-butylpyridinium iodide, 1-n-hexylpyridinium iodide, 1-n-octylpyridinium iodide, 1-n-dodecylpyridinium iodide, 1-phenylpyridinium iodide, 1-methyl-4-methylpyridinium iodide, 1-ethyl-4-methylpyridinium iodide, 1-n-butyl-4-methylpyridinium iodide, 1-n-hexyl-4-methylpyridinium iodide, 1-n-octyl-4-methylpyridinium iodide, 1-n-dodecyl-4-methylpyridinium iodide, 1-phenyl-4-methylpyridinium iodide, tetramethylammonium hydroxide, tetraethylammonium hydroxide, tetrabutylammonium hydroxide, tetrapropylammonium hydroxide, tetrahexylammonium hydroxide, tetraoctylammonium hydroxide, trimethyloctylammonium hydroxide, trimethylphenylammonium hydroxide, trimethylbenzylammonium hydroxide, triethyl-n-octylammonium hydroxide, triethylbenzylammonium hydroxide, tri-n-butyl-n-octylammonium hydroxide, tri-n-butylbenzylammonium hydroxide, methyl triphenylammonium hydroxide, ethyl triphenylammonium hydroxide, n-butyl triphenylammonium hydroxide, trimethylcetylammonium hydroxide, trimethylstearylammonium hydroxide, dimethylethylcetylammonium hydroxide, dimethyl didecylammonium hydroxide, dimethyl di-n-dodecylammonium hydroxide, dimethyl distearylammonium hydroxide, n-octyl dimethyl benzylammonium hydroxide, n-dodecyl dimethyl benzylammonium hydroxide, stearyl dimethyl benzylammonium hydroxide, triethyl-n-dodecylammonium hydroxide, tri-n-hexylmethylammonium hydroxide, tri-n-octylmethylammonium hydroxide, tri-n-decylmethylammonium hydroxide, tri-n-dodecylmethylammonium hydroxide, tri-n-octyl-n-dodecylammonium hydroxide, diethyl dicyclohexylammonium hydroxide, 1-methylpyridinium hydroxide, 1-ethylpyridinium hydroxide, 1-n-butylpyridinium hydroxide, 1-n-hexylpyridinium hydroxide, 1-n-octylpyridinium hydroxide, 1-n-dodecylpyridinium hydroxide, 1-phenylpyridinium hydroxide, 1-methyl-4-methylpyridinium hydroxide, 1-ethyl-4-methylpyridinium hydroxide, 1-n-butyl-4-methylpyridinium hydroxide, 1-n-hexyl-4-methylpyridinium hydroxide, 1-n-octyl-4-methylpyridinium hydroxide, 1-n-dodecyl-4-methylpyridinium hydroxide, 1-phenyl-4-methylpyridinium hydroxide, tetramethylammonium tetrafluoroborate, tetraethylammonium tetrafluoroborate, tetrapropylammonium tetrafluoroborate, tetrabutylammonium tetrafluoroborate, tetrahexylammonium tetrafluoroborate, tetraoctylammonium tetrafluoroborate, trimethyloctylammonium tetrafluoroborate, trimethylphenylammonium tetrafluoroborate, trimethylbenzylammonium tetrafluoroborate, triethyl-n-octylammonium tetrafluoroborate, triethylbenzylammonium tetrafluoroborate, tri-n-butyl-n-octylammonium tetrafluoroborate, tri-n-butylbenzylammonium tetrafluoroborate, methyl triphenylammonium tetrafluoroborate, ethyl triphenylammonium tetrafluoroborate, n-butyl triphenylammonium tetrafluoroborate, trimethylcetylammonium tetrafluoroborate, trimethylstearylammonium tetrafluoroborate, dimethylethylcetylammonium tetrafluoroborate, dimethyl didecylammonium tetrafluoroborate, dimethyl di-n-dodecylammonium tetrafluoroborate, dimethyl distearylammoniumtetrafluoroborate, n-octyl dimethyl benzylammonium tetrafluoroborate, n-dodecyl dimethyl benzylammonium tetrafluoroborate, stearyl dimethyl benzylammonium tetrafluoroborate, triethyl-n-dodecylammonium tetrafluoroborate, tri-n-hexylmethylammonium tetrafluoroborate, tri-n-octylmethylammonium tetrafluoroborate, tri-n-decylmethylammonium tetrafluoroborate, tri-n-dodecylmethylammonium tetrafluoroborate, tri-n-octyl-n-dodecylammonium tetrafluoroborate, diethyl dicyclohexylammonium tetrafluoroborate, 1-methylpyridinium tetrafluoroborate, 1-ethylpyridinium tetrafluoroborate, 1-n-butylpyridinium tetrafluoroborate, 1-n-hexylpyridinium tetrafluoroborate, 1-n-octylpyridinium tetrafluoroborate, 1-n-dodecylpyridinium tetrafluoroborate, 1-phenylpyridinium tetrafluoroborate, 1-methyl-4-methylpyridinium tetrafluoroborate, 1-ethyl-4-methylpyridinium tetrafluoroborate, 1-n-butyl-4-methylpyridinium tetrafluoroborate, 1-n-hexyl-4-methylpyridinium tetrafluoroborate, 1-n-octyl-4-methylpyridinium tetrafluoroborate, 1-n-dodecyl-4-methylpyridinium tetrafluoroborate, 1-phenyl-4-methylpyridinium tetrafluoroborate, tetramethylammonium hexafluorophosphate, tetraethylammonium hexafluorophosphate, tetrapropylammonium hexafluorophosphate, tetrabutylammonium hexafluorophosphate, tetrahexylammonium hexafluorophosphate, tetraoctylammonium hexafluorophosphate, trimethyloctylammonium hexafluorophosphate, trimethylphenylammonium hexafluorophosphate, trimethylbenzylammonium hexafluorophosphate, triethyl-n-octylammonium hexafluorophosphate, triethylbenzylammonium hexafluorophosphate, tri-n-butyl-n-octylammonium hexafluorophosphate, tri-n-butylbenzylammonium hexafluorophosphate, methyl triphenylammonium hexafluorophosphate, ethyl triphenylammonium hexafluorophosphate, n-butyl triphenylammonium hexafluorophosphate, trimethylcetylammonium hexafluorophosphate, trimethylstearylammonium hexafluorophosphate, dimethylethylcetylammonium hexafluorophosphate, dimethyl didecylammonium hexafluorophosphate, dimethyl di-n-dodecylammonium hexafluorophosphate, dimethyl distearylammonium hexafluorophosphate, n-octyl dimethyl benzylammonium hexafluorophosphate, n-dodecyl dimethyl benzylammonium hexafluorophosphate, stearyl dimethyl benzylammonium hexafluorophosphate, triethyl-n-dodecylammonium hexafluorophosphate, tri-n-hexylmethylammonium hexafluorophosphate, tri-n-octylmethylammonium hexafluorophosphate, tri-n-decylmethylammonium hexafluorophosphate, tri-n-dodecylmethylammonium hexafluorophosphate, tri-n-octyl-n-dodecylammonium hexafluorophosphate, diethyl dicyclohexylammonium hexafluorophosphate, 1-methylpyridinium hexafluorophosphate, 1-ethylpyridinium hexafluorophosphate, 1-n-butylpyridinium hexafluorophosphate, 1-n-hexylpyridinium hexafluorophosphate, 1-n-octylpyridinium hexafluorophosphate, 1-n-dodecylpyridinium hexafluorophosphate, 1-phenylpyridinium hexafluorophosphate, 1-methyl-4-methylpyridinium hexafluorophosphate, 1-ethyl-4-methylpyridinium hexafluorophosphate, 1-n-butyl-4-methylpyridinium hexafluorophosphate, 1-n-hexyl-4-methylpyridinium hexafluorophosphate, 1-n-octyl-4-methylpyridinium hexafluorophosphate, 1-n-dodecyl-4-methylpyridinium hexafluorophosphate, 1-phenyl-4-methylpyridinium hexafluorophosphate, p-toluenesulfonic acid tetramethylammonium, p-toluenesulfonic acid tetraethylammonium, p-toluenesulfonic acid tetrapropylammonium, p-toluenesulfonic acid tetrabutylammonium, p-toluenesulfonic acid tetrahexylammonium, p-toluenesulfonic acid tetraoctylammonium, p-toluenesulfonic acid trimethyloctylammonium, p-toluenesulfonic acid trimethylphenylammonium, p-toluenesulfonic acid trimethylbenzylammonium, p-toluenesulfonic acid triethyl-n-octylammonium, p-toluenesulfonic acid triethylbenzylammonium, p-toluenesulfonic acid tri-n-butyl-n-octylammonium, p-toluenesulfonic acid tri-n-butylbenzylammonium, p-toluenesulfonic acid methyl triphenylammonium, p-toluenesulfonic acid ethyl triphenylammonium, p-toluenesulfonic acid n-butyl triphenylammonium, p-toluenesulfonic acid trimethylcetylammonium, p-toluenesulfonic acid trimethylstearylammonium, p-toluenesulfonic acid dimethylethylcetylammonium, p-toluenesulfonic acid dimethyl didecylammonium, p-toluenesulfonic acid dimethyl di-n-dodecylammonium, dimethyl distearylammonium, p-toluenesulfonic acid n-octyl dimethyl benzylammonium, p-toluenesulfonic acid n-dodecyl dimethyl benzylammonium, p-toluenesulfonic acid stearyl dimethyl benzylammonium, p-toluenesulfonic acid triethyl-n-dodecylammonium, p-toluenesulfonic acid tri-n-hexylmethylammonium, p-toluenesulfonic acid tri-n-octylmethylammonium, p-toluenesulfonic acid tri-n-decylmethylammonium, p-toluenesulfonic acid tri-n-dodecylmethylammonium, p-toluenesulfonic acid tri-n-octyl-n-dodecylammonium, p-toluenesulfonic acid diethyl dicyclohexylammonium, p-toluenesulfonic acid 1-methylpyridinium, p-toluenesulfonic acid 1-ethylpyridinium, p-toluenesulfonic acid 1-n-butylpyridinium, p-toluenesulfonic acid 1-n-hexylpyridinium, p-toluenesulfonic acid 1-n-octylpyridinium, p-toluenesulfonic acid 1-n-dodecylpyridinium, p-toluenesulfonic acid 1-phenylpyridinium, p-toluenesulfonic acid 1-methyl-4-methylpyridinium, p-toluenesulfonic acid 1-ethyl-4-methylpyridinium, p-toluenesulfonic acid 1-n-butyl-4-methylpyridinium, p-toluenesulfonic acid 1-n-hexyl-4-methylpyridinium, p-toluenesulfonic acid 1-n-octyl-4-methylpyridinium, p-toluenesulfonic acid 1-n-dodecyl-4-methylpyridinium, p-toluenesulfonic acid 1-phenyl-4-methylpyridinium, perchloric acid tetramethylammonium, perchloric acid tetraethylammonium, perchloric acid tetrapropylammonium, perchloric acid tetrabutylammonium, perchloric acid tetrahexylammonium, perchloric acid tetraoctylammonium, perchloric acid trimethyloctylammonium, perchloric acid trimethylphenylammonium, perchloric acid trimethylbenzylammonium, perchloric acid triethyl-n-octylammonium, perchloric acid triethylbenzylammonium, perchloric acid tri-n-butyl-n-octylammonium, perchloric acid tri-n-butylbenzylammonium, perchloric acid methyl triphenylammonium, perchloric acid ethyl triphenylammonium, perchloric acid n-butyl triphenylammonium, perchloric acid trimethylcetylammonium, perchloric acid trimethylstearylammonium, perchloric acid dimethylethylcetylammonium, perchloric acid dimethyl didecylammonium, perchloric acid dimethyl di-n-dodecylammonium, dimethyl distearylammonium, perchloric acid n-octyl dimethyl benzylammonium, perchloric acid n-dodecyl dimethyl benzylammonium, perchloric acid stearyl dimethyl benzylammonium, perchloric acid triethyl-n-dodecylammonium, perchloric acid tri n-hexylmethylammonium, perchloric acid tri-n-octylmethylammonium, perchloric acid tri-n-decylmethylammonium, perchloric acid tri-n-dodecylmethylammonium, perchloric acid tri-n-octyl-n-dodecylammonium, perchloric acid diethyl dicyclohexylammonium, perchloric acid 1-methylpyridinium, perchloric acid 1-ethylpyridinium, perchloric acid 1-n-butylpyridinium, perchloric acid 1-n-hexylpyridinium, perchloric acid 1-n-octylpyridinium, perchloric acid 1-n-dodecylpyridinium, perchloric acid 1-phenylpyridinium, perchloric acid 1-methyl-4-methylpyridinium, perchloric acid 1-ethyl-4-methylpyridinium, perchloric acid 1-n-butyl-4-methylpyridinium, perchloric acid 1-n-hexyl-4-methylpyridinium, perchloric acid 1-n-octyl-4-methylpyridinium, perchloric acid 1-n-dodecyl-4-methylpyridinium, perchloric acid 1-phenyl-4-methylpyridinium and the like;

quaternary ammonium salt compounds each having a hydroxyalkyl group such as (2-hydroxypropyl)trimethylammonium chloride, hydroxyethyl trimethylammonium chloride, trimethylaminoethoxyethanol chloride, (2-hydroxypropyl)trimethylammonium bromide, hydroxyethyl trimethylammonium bromide, trimethylaminoethoxyethanol bromide, (2-hydroxypropyl)trimethylammonium fluoride, hydroxyethyl trimethylammonium fluoride, trimethylaminoethoxyethanol fluoride, (2-hydroxypropyl)trimethylammonium iodide, hydroxyethyl trimethylammonium iodide, trimethylaminoethoxyethanol iodide, (2-hydroxypropyl) trimethylammonium hydroxide, hydroxyethyl trimethylammonium hydroxide, trimethylaminoethoxyethanol hydroxide, (2-hydroxypropyl)trimethylammonium tetrafluoroborate, hydroxyethyl trimethylammonium tetrafluoroborate, trimethylaminoethoxyethanol tetrafluoroborate, (2-hydroxypropyl)trimethylammonium hexafluorophosphate, hydroxyethyl trimethylammonium phosphate, trimethylaminoethoxyethanol phosphate, p-toluenesulfonic acid (2-hydroxypropyl)trimethylammonium, p-toluenesulfonic acid hydroxyethyl trimethylammonium, p-toluenesulfonic acid trimethylaminoethoxyethanol, perchloric acid(2-hydroxypropyl)trimethylammonium, perchloric acid hydroxyethyl trimethylammonium, perchloric acid trimethylaminoethoxyethanol and the like; and quaternary ammonium compounds each having an aminoalkyl group such as 1-methyl-1-azania-4-azabicyclo[2,2,2] octanium chloride, 1,1-dimethyl-4-methylpiperidinium chloride, 1-methylmorpholinium, 1-methylpiperidinium chloride, 1-methyl-1-azania-4-azabicyclo[2,2,2]octanium bromide, 1,1-dimethyl-4-methylpiperidinium, 1-methylmorpholinium bromide, 1-methylpiperidinium bromide, 1-methyl-1-azania-4-azabicyclo[2,2,2]octanium fluoride, 1,1-dimethyl-4-methylpiperidinium fluoride, 1-methylmorpholinium fluoride, 1-methylpiperidinium fluoride, 1-methyl-1-azania-4-azabicyclo[2,2,2]octanium iodide, 1,1-dimethyl-4-methylpiperidinium iodide, 1-methylmorpholinium iodide, 1-methylpiperidinium iodide, 1-methyl-1-azania-4-azabicyclo[2,2,2]octanium hydroxide, 1,1-dimethyl-4-methylpiperidinium hydroxide, 1-methylmorpholinium hydroxide, 1-methylpiperidinium hydroxide, 1-methyl-1-azania-4-azabicyclo[2,2,2]octanium trimethylammonium tetrafluoroborate, 1,1-dimethyl-4-methylpiperidinium trimethylammonium tetrafluoroborate, 1-methylmorpholinium trimethylammonium tetrafluoroborate, 1-methylpiperidinium trimethylammonium tetrafluoroborate, 1-methyl-1-azania-4-azabicyclo[2,2,2]octanium hexafluorophosphate, 1,1-dimethyl-4-methylpiperidinium hexafluorophosphate, 1-methylmorpholinium hexafluorophosphate, 1-methylpiperidinium hexafluorophosphate, p-toluenesulfonic acid 1-methyl-1-azania-4-azabicyclo[2,2,2]octanium, p-toluenesulfonic acid 1,1-dimethyl-4-methylpiperidinium, p-toluenesulfonic acid 1-methylmorpholinium, p-toluenesulfonic acid 1-methylpiperidinium, perchloric acid 1-methyl-1-azania-4-azabicyclo[2,2,2]octanium, perchloric acid 1,1-dimethyl-4-methylpiperidinium, perchloric acid 1-methylmorpholinium, perchloric acid 1-methylpiperidinium and the like, but are not restricted only to these exemplified compounds.

Furthermore, when Y in the general formula (2) is a phosphorus atom, concrete examples of the compound of the general formula (2) include quaternary phosphonium salt compounds each having an alkyl group such as tetramethylphosphonium chloride, tetraethylphosphonium chloride, tetrapropylphosphonium chloride, tetrabutylphosphonium chloride, tetrahexylphosphonium chloride, tetraoctylphosphonium chloride, ethyl triphenylphosphonium chloride, tetraphenylphosphonium chloride, butyl triphenylphosphonium chloride, benzyl triphenylphosphonium chloride, methoxymethyl triphenylphosphonium chloride, tetramethylphosphonium bromide, tetraethylphosphonium bromide, tetrapropylphosphonium bromide, tetrabutylphosphonium bromide, tetrahexylphosphonium bromide, tetraoctylphosphonium bromide, ethyl triphenylphosphonium bromide, tetraphenylphosphonium bromide, butyl triphenylphosphonium bromide, benzyl triphenylphosphonium bromide, methoxymethyl triphenylphosphonium bromide, ethyl triphenylphosphonium acetate, ethyl triphenylphosphonium iodide, tetraethylphosphonium hydroxide, tetrabutylphosphonium hydroxide, tetraphenylphosphonium tetrakis(4-methylphenyl)borate, tetraphenylphosphonium tetraphenylborate, tetrabutylphosphonium-o,o-diethyl phosphorodithioate and the like; and quaternary ammonium salt compounds each having a hydroxyalkyl group such as tetrahydroxymethylphosphonium sulfate, tetrahydroxyethylphosphonium sulfate and the like, but are not restricted only to these exemplified compounds.

Of these exemplified compounds, as the compound represented by the general formula (2), preferred are a tetramethylammonium salt, a tetraethylammonium salt, a tetrapropylammonium salt, a tetrabutylammonium salt, a trioctylmethylammonium salt, a tributylbenzylammonium salt, a tetramethylphosphonium salt, a tetraethylphosphonium salt, a tetrapropylphosphonium salt, a tetrabutylphosphonium salt and a methoxymethyl triphenylphosphonium salt, more preferred are tetraethylammonium chloride, tetrabutylammonium fluoride, tetrabutylammonium chloride, tetrabutylammonium bromide, tetrabutylammonium iodide, tetrabutylammonium tetrafluoroborate, trioctylmethylammonium chloride, tributylbenzylammonium chloride, tetrabutylphosphonium chloride, tetrabutylphosphonium bromide and methoxymethyl triphenylphosphonium chloride, and further preferred are tetrabutylammonium chloride, tetrabutylammonium bromide, tetraethylammonium bromide, tetrabutylammonium tetrafluoroborate, trioctylmethylammonium chloride, tributylbenzylammonium chloride, tetrabutylphosphonium chloride and tetrabutylphosphonium bromide. These quaternary ammonium salt compounds and quaternary phosphonium salt compounds may be used singly, or two or more compounds may be used in combination.

In the present invention, the amount of the compound of the general formula (1) without using the compound of the general formula (2) is generally from 0.0005 to 5 weight parts and preferably from 0.001 to 2 weight parts, based on the total 100 weight parts of one or two or more isocyanates selected from isocyanate compounds and isothiocyanate compounds, and one or two or more active hydrogen compounds each having a mercapto group. The amount used is suitably determined depending on the type of catalysts, the type and amount of monomers (isocyanates, active hydrogen compounds, resin modifiers to be described later or the like) and additives in use, and the shape of molded products.

Furthermore, in the present invention, when the compound of the general formula (1) and the compound of the general formula (2) are used together, the ratio of the compound of the general formula (1) and the compound of the general formula (2) in use is not particularly limited, and any mixing ratio may be good. However, the molar ratio of the compound of the general formula (2) to the compound of the general formula (1) is in the range of 0.01 to 100, preferably in the range of 0.05 to 100, and more preferably in the range of 0.5 to 50 based on the compound of the general formula (1). When the molar ratio of the compound of the general formula (2) is within the above range, the catalytic activity of the compound of the general formula (1) is rapidly improved, and sufficient dissolution of the compound of the general formula (2) in the polymerizable composition is secured. Therefore, a resin with high transparency can be obtained.

When the compound of the general formula (1) and the compound of the general formula (2) are used together, the amount of the compound of the general formula (1) and the compound of the general formula (2) used may be such that the total amount of the compound of the general formula (1) and the compound of the general formula (2) is in the range of 0.0005 to 5 weight parts, preferably in the range of 0.0010 to 0.3 weight parts, and more preferably in the range of 0.0010 to 2 weight parts, based on the total 100 weight parts of one or two or more isocyanates selected from isocyanate compounds and isothiocyanate compounds, and one or two or more active hydrogen compounds each having a thiol group. The amount used is suitably determined depending on the type of catalysts, the type and amount of monomers (isocyanates, active hydrogen compounds, resin modifiers to be described later or the like) and additives in use, and the shape of molded products.

A method to add a catalyst to monomers is not particularly limited, and the compound of the general formula (1) and the compound of the general formula (2) may be properly added to monomers, resin modifiers or the like in use. Or, a mixture of the compound of the general formula (1) and the compound of the general formula (2) is obtained, and then the mixture may be added to monomers, resin modifiers or the like.

For example, there can be mentioned a method including adding the compound of the general formula (1) and the compound of the general formula (2) respectively, or adding a mixture of the compound of the general formula (1) and the compound of the general formula (2) to isocyanates, active hydrogen compounds, or a resin modifier such as a hydroxy compound or the like; a method including adding the compound of the general formula (1) and the compound of the general formula (2) respectively, or adding a mixture of the compound of the general formula (1) and the compound of the general formula (2) to a mixture of isocyanates and the active hydrogen compounds; a method including adding the compound of the general formula (1) and the compound of the general formula (2) respectively, or adding a mixture of the compound of the general formula (1) and the compound of the general formula (2) to a mixture of isocyanates and a resin modifier such as a hydroxy compound or the like; a method including adding the compound of the general formula (1) and the compound of the general formula (2) respectively, or adding a mixture of the compound of the general formula (1) and the compound of the general formula (2) to a mixture of active hydrogen compounds and a resin modifier such as a hydroxy compound or the like; and a method including adding the compound of the general formula (1) and the compound of the general formula (2) respectively, or adding a mixture of the compound of the general formula (1) and the compound of the general formula (2) to a mixture of isocyanates, active hydrogen compounds and a resin modifier such as a hydroxy compound or the like, but are not restricted only to these exemplified methods. It can be properly selected depending on the solubility, operability, safety, expediency and the like of a catalyst.

The polymerizable composition for polythiourethane optical materials of the present invention contains one or two or more isocyanates selected from the group consisting of isocyanate compounds and isothiocyanate compounds, and one or two or more active hydrogen compounds each having a mercapto group as main ingredients. However, for the purpose of modification of the polythiourethane resin, a hydroxy compound may further be added.

In the present invention, concrete examples of preferred isocyanate compound which is used as a raw material of the polythiourethane resin include monofunctional isocyanate compounds such as methyl isocyanate, ethyl isocyanate, n-propyl isocyanate, isopropyl isocyanate, n-butyl isocyanate, sec-butyl isocyanate, tert-butyl isocyanate, pentyl isocyanate, hexyl isocyanate, heptyl isocyanate, octyl isocyanate, decyl isocyanate, lauryl isocyanate, myristyl isocyanate, octadecyl isocyanate, 3-pentyl isocyanate, 2-ethylhexyl isocyanate, 2,3-dimethylcyclohexyl isocyanate, 2-methoxyphenyl isocyanate, 4-methoxyphenyl isocyanate, α-methylbenzyl isocyanate, phenylethyl isocyanate, phenyl isocyanate, o-, m-, p-tolyl isocyanate, cyclohexyl isocyanate, benzyl isocyanate, isocyanatomethyl bicycloheptane and the like;

aliphatic polyisocyanate compounds such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanalomethyloctane, bis(isocyanatoethyl)carbonate, bis(isocyanatoethyl)ether, lysine diisocyanatomethyl ester, lysine triisocyanate and the like;

alicyclic polyisocyanate compounds such as isophorone diisocyanate, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyl dimethylmethane isocyanate, 2,2-dimethyldicyclohexylmethane isocyanate, 2,5-bis(isocyanatomethyl)bicyclo-[2,2,1]-heptane, 2,6-bis(isocyanatomethyl)bicyclo-[2,2,1]-heptane, 3,8-bis(isocyanatomethyl)tricylcodecane, 3,9-bis(isocyanatomethyl)tricylcodecane, 4,8-bis(isocyanatomethyl)tricylcodecane, 4,9-bis(isocyanatomethyl)tricyclodecane and the like;

aromatic polyisocyanate compounds such as o-xylylene diisocyanate, p-xylylene diisocyanate, m-xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethyl)diphenyl ether, phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, phenylisocyanatoethyl isocyanate, hexahydrobenzene diisocyanate, hexahydrodiphenylmethane-4,4-diisocyanate, bis(isocyanatoethyl)phthalate, mesitylylene triisocyanate, 2,6-di(isocyanatomethyl)furan and the like;

sulfur-containing aliphatic polyisocyanate compounds such as bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatopropyl)disulfide, bis(isocyanatomethylthio)methane, bis(isocyanatoethylthio)methane, bis(isocyanatoethylthio)ethane, bis(isocyanatomethylthio)ethane, 1,5-diisocyanato-2-isocyanatomethyl-3-thiapentane and the like;

sulfur-containing aromatic polyisocyanate compounds such as diphenylsulfide-2,4-diisocyanate, diphenylsulfide-4,4-diisocyanate, 3,3-dimethoxy-4,4-diisocyanatodibenzylthioether, bis(4-isocyanatomethylbenzene)sulfide, 4,4-methoxybenzenethioethylene glycol-3,3-diisocyanate, diphenyldisulfide-4,4-diisocyanate, 2,2-dimethyldiphenyldisulfide-5,5-diisocyanate, 3,3-dimethyldiphenyldisulfide-5,5-diisocyanate, 3,3-dimethyldiphenyldisulfide-6,6-diisocyanate, 4,4-dimethyldiphenyldisulfide-5,5-diisocyanate, 3,3-dimethoxydiphenyldisulfide-4,4-diisocyanate, 4,4-dimethoxydiphenyldisulfide-3,3-diisocyanate and the like; and sulfur-containing heterocyclic polyisocyanate compounds such as 2,5-diisocyanatothiophene, 2,5-bis(isocyanatomethyl)thiophene, 2,5-diisocyanato tetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, 4,5-bis(isocyanatomethyl)-2-methyl-1,3-dithiolane and the like, but are not restricted only to these exemplified compounds.

Their halogen substituted compounds such as chlorine substituted compounds, bromine substituted compounds or the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products or the like may be employed. These isocyanate compounds may be used singly, or two or more compounds may be used in combination.

In the present invention, an isothiocyanate compound which is used as a raw material of the polythiourethane resin is selected from isothiocyanate compounds and isothiocyanate compounds each having an isocyanate group.

Concrete examples of preferred isothiocyanate compound used in the present invention include monofunctional isothiocyanate compounds such as methyl isothiocyanate, ethyl isothiocyanate, n-propyl isothiocyanate, isopropyl isothiocyanate, n-butyl isothiocyanate, sec-butyl isothiocyanate, tert-butyl isothiocyanate, pentyl isothiocyanate, hexyl isothiocyanate, heptyl isothiocyanate, octyl isothiocyanate, decyl isothiocyanate, lauryl isothiocyanate, myristyl isothiocyanate, octadecyl isothiocyanate, 3-pentyl isothiocyanate, 2-ethylhexyl isothiocyanate, 2,3-dimethylcyclohexyl isothiocyanate, 2-methoxyphenyl isothiocyanate, 4-methoxyphenyl isothiocyanate, α-methylbenzyl isothiocyanate, phenylethyl isothiocyanate, phenyl isothiocyanate, o-, m-, p-tolyl isothiocyanate, cyclohexyl isothiocyanate, benzyl isothiocyanate, isothiocyanatomethyl bicycloheptane and the like;

aliphatic polyisothiocyanate compounds such as hexamethylene diisothiocyanate, 2,2-dimethylpentane diisothiocyanate, 2,2,4-trimethylhexane diisothiocyanate, butene diisothiocyanate, 1,3-butadiene-1,4-diisothiocyanate, 2,4,4-trimethylhexamethylene diisothiocyanate, 1,6,11-undecane triisothiocyanate, 1,3,6-hexamethylene triisothiocyanate, 1,8-diisothiocyanato-4-isothiocyanatomethyl octane, bis(isothiocyanatoethyl)carbonate, bis(isothiocyanatoethyl)ether, lysine diisothiocyanatomethyl ester, lysine triisothiocyanate, xylylene diisothiocyanate, bis(isothiocyanatoethyl)benzene, bis(isothiocyanatopropyl)benzene, α,α,α',α'-tetramethylxylylene diisothiocyanate, bis(isothiocyanatobutyl)benzene, bis(isothiocyanatomethyl)naphthalene, bis(isothiocyanatomethyl)diphenyl ether, bis (isothiocyanatoethyl)phthalate, mesitylylene triisothiocyanate, 2,6-di(isothiocyanatomethyl)furan and the like;

alicyclic polyisothiocyanate compounds such as isophorone diisothiocyanate, bis(isothiocyanatomethyl)cyclohexane, dicyclohexylmethane diisothiocyanate, cyclohexane diisothiocyanate, methylcyclohexane diisothiocyanate, dicyclohexyl dimethylmethane isothiocyanate, 2,2-dimethyldicyclohexylmethane isothiocyanate, 2,5-bis(isothiocyanatomethyl)bicyclo-[2,2,1]-heptane, 2,6-bis(isothiocyanatomethyl)bicyclo-[2,2,1]-heptane, 3,8-bis(isothiocyanatomethyl)tricylcodecane, 3,9-bis(isothiocyanatomethyl)tricylcodecane, 4,8-bis(isothiocyanatomethyl)tricylcodecane, 4,9-bis(isothiocyanatomethyl)tricyclodecane and the like;

aromatic polyisothiocyanate compounds such as phenylene diisothiocyanate, tolylene diisothiocyanate, ethylphenylene diisothiocyanate, isopropylphenylene diisothiocyanate, dimethylphenylene diisothiocyanate, diethylphenylene diisothiocyanate, diisopropylphenylene diisothiocyanate, trimethylbenzene triisothiocyanate, benzene triisothiocyanate, biphenyl diisothiocyanate, toluidine diisothiocyanate, 4,4-diphenylmethane diisothiocyanate, 3,3-dimethyldiphenylmethane-4,4-diisothiocyanate, bibenzyl-4,4-diisothiocyanate, bis(isothiocyanatophenyl)ethylene, 3,3-dimethoxybiphenyl-4,4-diisothiocyanate, phenylisothiocyanatoethyl isothiocyanate, hexahydrobenzene diisothiocyanate, hexahydrodiphenylmethane-4,4-diisothiocyanate and the like;

sulfur-containing aliphatic polyisothiocyanate compounds such as bis(isothiocyanatoethyl)sulfide, bis(isothiocyanatopropyl)sulfide, bis(isothiocyanatohexyl)sulfide, bis(isothiocyanatomethyl)sulfone, bis(isothiocyanatomethyl)disulfide, bis(isothiocyanatopropyl)disulfide, bis(isothiocyanatomethylthio)methane, bis(isothiocyanatoethylthio)methane, bis(isothiocyanatoethylthio)ethane, bis(isothiocyanatomethylthio)ethane, 1,5-diisothiocyanato-2-isothiocyanatomethyl-3-thiapentane and the like;

sulfur-containing aromatic polyisothiocyanate compounds such as diphenylsulfide-2,4-diisothiocyanate, diphenylsulfide-4,4-diisothiocyanate, 3,3-dimethoxy-4,4-diisothiocyanatodibenzylthioether, bis(4-isothiocyanatomethylbenzene)sulfide, 4,4-methoxybenzenethioethylene glycol-3,3-diisothiocyanate, diphenyldisulfide-4,4-diisothiocyanate, 2,2-dimethyldiphenyldisulfide-5,5-diisothiocyanate, 3,3-dimethyldiphenyldisulfide-5,5-diisothiocyanate, 3,3-dimethyldiphenyldisulfide-6,6-diisothiocyanate, 4,4-dimethyldiphenyldisulfide-5,5-diisothiocyanate, 3,3-dimethoxydiphenyldisulfide-4,4-diisothiocyanate, 4,4-dimethoxydiphenyldisulfide-3,3-diisothiocyanate and the like; and sulfur-containing heterocyclic polyisothiocyanate compounds such as 2,5-diisothiocyanatothiophene, 2,5-bis(isothiocyanatomethyl)thiophene, 2,5-diisothiocyanato tetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, 4,5-bis(isothiocyanatomethyl)-1,3-dithiolane, 4,5-bis(isothiocyanatomethyl)-2-methyl-1,3-dithiolane and the like, but are not restricted only to these exemplified compounds.

Their halogen substituted compounds such as chlorine substituted compounds, bromine substituted compounds or the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products or the like may be employed. These isothiocyanate compounds may be used singly, or two or more compounds may be used in combination.

Examples of the isothiocyanate compound having an isocyanate group which is used as a raw material in the present invention include aliphatic or alicyclic compounds such as 1-isocyanato-3-isothiocyanatopropane, 1-isocyanato-5-isothiocyanatopentane, 1-isocyanato-6-isothiocyanatohexane, isocyanatocarbonyl isothiocyanate, 1-isocyanato-4-isothiocyanatocyclohexane and the like;

aromatic compounds such as 1-isocyanato-4-isothiocyanatobenzene, 4-methyl-3-isocyanato-1-isothiocyanatobenzene and the like;

heterocyclic compounds such as 2-isocyanato-4,5-diisothiocyanato-1,3,5-triazine and the like;

isothiocyanato groups such as 4-isocyanato-4'-isothiocyanato diphenylsulfide, 2-isocyanato-2'-isothiocyanatodiethyl disulfide and the like; and their sulfur substituted compounds.

Furthermore, their halogen substituted compounds such as chlorine substituted compounds, bromine substituted compounds or the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products or the like may be employed.

These isocyanates may each independently be used, or two or more compounds may be used in combination. As isocyanates, more preferably used are m-xylylene diisocyanate, 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane and hexamethylene diisocyanate, and particularly preferably used are m-xylylene diisocyanate, 2,5-bis(isocyanatomethyl)-bicyclo[2.2.1]heptane and 2,6-bis(isocyanatomethyl)-bicyclo[2.2.1]heptane.

The active hydrogen compound having a mercapto group which is used as a raw material of the polythiourethane resin of the present invention is selected from mercapto compounds and mercapto compounds each having a hydroxy group.

Examples of the mercapto compound used in the present invention include aliphatic polythiol compounds such as methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, 1,2-dimercaptopropylmethyl ether, 2,3-dimercaptopropylmethyl ether, 2,2-bis(mercaptomethyl)-1,3-propanedithiol, bis(2-mercaptoethyl)ether, tetrakis(mercaptomethyl)methane and the like;

aliphatic polythiol compounds each having one or more ester bonds such as 2,3-dimercaptosuccinic acid (2-mercaptoethyl ester), thiomalic acid bis(2-mercaptoethyl ester), 2,3-dimercapto-1-propanol(2-mercaptoacetate), 2,3-dimercapto-1-propanol(3-mercaptopropionate), 3-mercapto-1,2-propanediol bis(2-mercaptoacetate), 3-mercapto-1,2-propanediol bis(3-mercaptopropionate), diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerine tris(2-mercaptoacetate), glycerine tris(3-mercaptopropionate), 1,4-cyclohexanediol bis(2-mercaptoacetate), 1,4-cyclohexanediol bis(3-mercaptopropionate) and the like;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-dichlorobenzene-1,3-dithiol, 1,3-di(p-chlorophenyl)propane-2,2-dithiol, 3,4,5-tribromo-1,2-dimercaptobenzene, 2,3,4,6-tetrachlor-1,5-bis(mercaptomethyl)benzene and the like;

heterocyclic thiol compounds such as 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine and the like; and halogen substituted compounds thereof, but are not restricted only to these exemplified compounds.

Furthermore, their halogen substituted compounds such as chlorine substituted compounds, bromine substituted compounds or the like may be employed. These mercapto compounds may be used singly, or two or more compounds may be used in combination.

Examples of the mercapto compound having one or more sulfide bonds in one molecule include aliphatic polythiol compounds such as bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,1'-dimercapto-3,6,9-trithiaundecane, 4,7-dimercaptomethyl-1,1'-dimercapto-3,6,9-trithiaundecane, 4,8-dimercaptomethyl-1,1'-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-2,5-dimethyl-1,4-dithiane or the like and thioglycolic acid ester and mercaptopropionic acid ester thereof;

aliphatic polythiols each having one or more ester bonds such as hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(3-mercaptopropionate), thiodiglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), thiodipropionic acid bis(2,3-dimercaptopropyl ester), dithiodipropionic acid bis(2,3-dimercaptopropyl ester) or the like;

heterocyclic polythiol compounds such as 3,4-thiophenedithiol, bismuthiol or the like;

1,1,3,3-tetrakis(mercaptomethylthio)propane, 1,1,2,2-tetrakis(mercaptomethylthio)ethane, 4,6-bis(mercaptomethylthio)-1,3-dithiane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethanethiol, 2-(4,5-dimercapto-2-thiapentyl)-1,3-dithiacylcopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 3-mercaptomethylthio-1,6-dimercapto-2,5-dithiahexane, 2-(2,2-bis(mercaptomethylthio)ethyl)-1,3-dithietane, 1,1,9,9-tetrakis(mercaptomethylthio)-5-(3,3-bis(mercaptomethyl thio)-1-thiapropyl)-3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis (mercaptomethylthio)-2-thiabutyl)methane, 3,5,9,11-tetrakis(mercaptomethylthio)-1,13-dimercapto-2,6,8,12-tetrathiamidecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercaptomethylthio)-1,17-dimercapto-2,6,8,10,12,16-hexathiaheptadecane, 3,4,8,9-tetrakis(mercaptomethylthio)-1,1'-dimercapto-2,5,7,10-tetrathiaundecane, 3,4,8,9,13,14-hexakis(mercaptomethylthio)-1,16-dimercapto-2,5,7,10,12,15-hexathiahexadecane, 8-[bis(mercaptomethylthio)methyl]-3,4,12,13-tetrakis(mercaptomethylthio)-1,15-dimercapto-2,5,7,9,11,14-hexathiapentadecane, 4,6-bis[3,5-bis(mercaptomethylthio)-7-mercapto-2,6-dithiaheptylthio]-1,3-dithiane, 4-[3,5-bis(mercaptomethylthio)-7-mercapto-2,6-dithiaheptylthio]-6-mercaptomethylthio-1,3-dithiane, 1,1-bis[4-(6-mercaptomethylthio)-1,3-dithianylthio]-1,3-bis(mercaptomethylthio)propane, 1-[4-(6-mercaptomethylthio)-1,3-dithianylthio]-3-[2,2-bis(mercaptomethylthio)ethyl]-7,9-bis(mercaptomethylthio)-2,4,6,10-tetrathiaundecane, 1,5-bis[4-(6-mercaptomethylthio)-1,3-dithianylthio]-3-[2-(1,3-dithietanyl)]methyl-2,4-dithiapentane, 4,6-bis{3-[2-(1,3-dithietanyl)]methyl-5-mercapto-2,4-dithiapentylthio}-1,3-dithiane, 4,6-bis[4-(6-mercaptomethylthio)-1,3-dithianylthio]-6-[4-(6-mercaptomethylthio)-1,3-dithianylthio]-1,3-dithiane, 3-[2-(1,3-dithietanyl)]methyl-7,9-bis(mercaptomethylthio)-1,1'-dimercapto-2,4,6,10-tetrathiaundecane, 9-[2-(1,3-dithietanyl)]methyl-3,5,13,15-tetrakis(mercaptomethylthio)-1,17-dimercapto-2,6,8,10,12,16-hexathiaheptadecane, 3-[2-(1,3-dithietanyl)]methyl-7,9,13,15-tetrakis(mercaptomethylthio)-1,17-dimercapto-2,4,6,10,12,16-hexathiaheptadecane, 3,7-bis[2-(1,3-dithietanyl)]methyl-1,9-dimercapto-2,4,6,8-tetrathianonane, 4-[3,4,8,9-tetrakis(mercaptomethylthio)-11-mercapto-2,5,7,10-tetrathiaundecyl]-5-mercaptomethylthio-1,3-dithiolane, 4,5-bis[3,4-bis(mercaptomethylthio)-6-mercapto-2,5-dithiahexylthio]-1,3-dithiolane, 4-[3,4-bis(mercaptomethylthio)-6-mercapto-2,5-dithiahexylthio]-5-mercaptomethylthio-1,3-dithiolane, 4-[3-bis(mercaptomethylthio)methyl-5,6-bis(mercaptomethylthio)-8-mercapto-2,4,7-trithiaoctyl]-5-mercaptomethylthio-1,3-dithiolane, 2-{bis[3,4-bis(mercaptomethylthio)-6-mercapto-2,5-dithiahexylthio]methyl}-1,3-dithietane, 2-[3,4-bis(mercaptomethylthio)-6-mercapto-2,5-dithiahexylthio]mercaptomethylthiomethyl-1,3-dithietane, 2-[3,4,8,9-tetrakis(mercaptomethylthio)-11-mercapto-2,5,7,10-tetrathiaundecylthio]mercaptomethylthiomethyl-1,3-dithietane, 2-[3-bis(mercaptomethylthio)methyl-5,6-bis(mercaptomethylthio)-8-mercapto-2,4,7-trithiaoctyl]mercaptomethylthiomethyl-1,3-dithietane, 4,5-bis{1-[2-(1,3-dithietanyl)]-3-mercapto-2-thiapropylthio}-1,3-dithiolane, 4-1'-[2-(1,3-dithietanyl)]-3-mercapto-2-thiapropylthiol-5-[1,2-bis(mercaptomethylthio)-4-mercapto-3-thiabutylthio]-1,3-dithiolane, 2-{bis[4-(5-mercaptomethylthio-1,3-dithioranyl)thio]methyl}-1,3-dithietane, 4-[4-(5-mercaptomethylthio-1,3-dithioranyl)thio]-5-{1-[2-(1,3-dithietanyl)]-3-mercapto-2-thiapropylthio}-1,3-dithiolane, and their polythiol compounds having dithioacetal or dithioketal skeletons such as their oligomer or the like;

tris(mercaptomethylthio)methane, tris(mercaptoethylthio)methane, 1,1,5,5-tetrakis(mercaptomethylthio)-2,4-dithiapentane, bis[4,4-bis(mercaptomethylthio)-1,3-dithiabutyl]-(mercaptomethylthio)methane, tris[4,4-bis(mercaptomethylthio)-1,3-dithiabutyl]methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl-1-yl)methylthio]methane, 2,4-bis(mercaptomethylthio)-1,3-dithiacylcopentane, 2-mercaptoethylthio-4-mercaptomethyl-1,3-dithiacylcopentane, 2-(2,3-dimercaptopropylthio)-1,3-dithiacylcopentane, 4-mercaptomethyl-2-(2,3-dimercaptopropylthio)-1,3-dithiacylcopentane, 4-mercaptomethyl-2-(1,3-dimercapto-2-propylthio)-1,3-dithiacylcopentane, tris[2,2-bis(mercaptomethylthio)-2-thiapropyl]methane, tris[4,4-bis(mercaptomethylthio)-3-thiabutyl]methane, 2,4,6-tris[3,3-bis(mercaptomethylthio)-2-thiapropyl]-1,3,5-trithiacyclohexane, tetrakis[3,3-bis(mercaptomethylthio)-2-thiapropyl]methane, and polythiol compounds having ortho trithioformic ester skeletons such as their oligomer or the like, but are not restricted only to these exemplified compounds. Furthermore, their halogen substituted compounds such as chlorine substituted compounds, bromine substituted compounds or the like may be employed. These mercapto compounds each having a sulfide bond may be used singly, or two or more compounds may be used in combination.

Furthermore, examples of the mercapto compound having a hydroxy group include 2-mercaptoethanol, 3-mercapto-1,2-propanediol, glycerine di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfide mono(3-mercaptopropionate), dimercaptoethane mono(salicylate), hydroxyethylthiomethyl-tris(mercaptoethylthio)methane and the like, but are not restricted only to these exemplified compounds. Furthermore, their halogen substituted compounds such as chlorine substituted compounds, bromine substituted compounds or the like may be employed. These mercapto compounds each having a hydroxy group may be used singly, or two or more compounds may be used in combination.

These active hydrogen compounds may be used singly, or two or more compounds may be used in combination. As the active hydrogen compound, preferably used are 4-mercaptomethyl-1,8-dimercapto-3,6-dithiaoctane, 5,7-dimercaptomethyl-1,1'-dimercapto-3,6,9-trithiaundecane, 4,7-dimercaptomethyl-1,1'-dimercapto-3,6,9-trithiaundecane, 4,8-dimercaptomethyl-1,1'-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2,2-bis(mercaptomethylthio)ethyl)-1,3-dithietane, and further preferably used are 4-mercaptomethyl-1,8-dimercapto-3,6-dithiaoctane, 5,7-dimercaptomethyl-1,1'-dimercapto-3,6,9-trithiaundecane, 4,7-dimercaptomethyl-1,1'-dimercapto-3,6,9-trithiaundecane, 4,8-dimercaptomethyl-1,1'-dimercapto-3,6,9-trithiaundecane and pentaerythritol tetrakis(3-mercaptopropionate).

The polythiourethane resin of the present invention contains one or two or more isocyanates selected from the group consisting of isocyanate compounds and isothiocyanate compounds, and one or two or more active hydrogen compounds each having a mercapto group as main ingredients. However, for the purpose of modification of the polythiourethane resin, a resin modifier such as a hydroxy compound, an amine compound, an epoxy resin, an organic acid and its anhydride, an olefin compound containing a (meth)acrylate compound or the like may be added. Herein, the resin modifier refers to a compound in which physical properties such as refractive index, Abbe number, heat resistance, specific gravity and the like, and mechanical strength such as impact resistance or the like of the polythiourethane resin are adjusted or improved.

Examples of the hydroxy compound which can be added as a resin modifier include diethylene glycol, triethylene glycol, 1,3-propanediol, dipropylene glycol, tripropylene glycol, 1,4-butanediol, 1,3-butanediol, 1,5-pentanediol, 1,4-pentanediol, 1,3-pentanediol, 1,6-hexanediol, 1,5-hexanediol, 1,4-hexanediol, 1,3-hexanediol, 1,7-heptanediol, 1,8-octanediol, thiodiethanol, dithiodiethanol, thiodipropanol, dithiodipropanol and their oligomer, but are not restricted only to these exemplified compounds. These alcohol compounds may be used singly, or two or more compounds may be used in combination.

Examples of the amine compound which can be added as a resin modifier include monofunctional primary amine compounds such as ethylamine, n-propylamine, isopropylamine, n-butylamine, sec-butylamine, ter-butylamine, pentylamine, hexylamine, heptylamine, octylamine, decylamine, laurylamine, myristylamine, 3-pentylamine, 2-ethylhexylamine, 1,2-dimethylhexylamine, allylamine, aminomethyl bicycloheptane, cyclopentylamine, cyclohexylamine, 2,3-dimethylcyclohexylamine, aminomethylcyclohexane, aniline, benzylamine, phenethylamine, 2,3- or 4-methylbenzylamine, o-, m- or p-methylaniline, o-, m- or p-ethylaniline, aminomorpholine, naphthylamine, furfurylamine, α-aminodiphenylmethane, toluidine, aminopyridine, aminophenol, aminoethanol, 1-aminopropanol, 2-aminopropanol, aminobutanol, aminopentanol, aminohexanol, methoxyethylamine, 2-(2-aminoethoxy)ethanol, 3-ethoxypropylamine, 3-propoxypropylamine, 3-butoxypropylamine, 3-isopropoxypropylamine, 3-isobutoxypropylamine, 2,2-diethoxyethylamine and the like;

primary polyamine compounds such as ethylenediamine, 1,2- or 1,3-diaminopropane, 1,2-, 1,3- or 1,4-diaminobutane, 1,5-diaminopentane, 1,6-diaminohexane, 1,7-diaminoheptane, 1,8-diaminooctane, 1,10-diaminodecane, 1,2-, 1,3- or 1,4-diaminocyclohexane, o-, m- or p-diaminobenzene, 3,4- or 4,4'-diaminobenzophenone, 3,4- or 4,4'-diaminodiphenyl ether, 4,4'-diaminodiphenyl methane, 4,4'-diaminodiphenyl sulfide, 3,3'- or 4,4'-diaminodiphenyl sulfone, 2,7-diaminofluorene, 1,5-, 1,8- or 2,3-diaminonaphthalene, 2,3-, 2,6- or 3,4-diaminopyridine, 2,4- or 2,6-diaminotoluene, m- or p-xylylenediamine, isophorone diamine, diaminomethyl bicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, N-aminopropylmorpholine and the like;

monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, morpholine and the like; and secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, tetramethylguanidine and the like, but are not restricted only to these exemplified compounds. These amine compounds may be used singly, or two or more compounds may be used in combination.

Examples of the epoxy resin which can be added as a resin modifier include a phenol type epoxy compound obtained by the condensation reaction of a polyhydric phenol compound such as bisphenol A glycidyl ether or the like with an epihalohydrin compound, an alcohol type epoxy compound obtained by condensation of a polyhydric alcohol compound such as hydrogenated bisphenol A glycidyl ether or the like with an epihalohydrin compound, a glycidyl ester type epoxy compound obtained by condensation of a multivalent organic acid compound such as 3,4-epoxycyclohexylmethyl-3',4'-epoxycyclohexane carboxylate, 1,2-hexahydrophthalic acid diglycidyl ester or the like with an epihalohydrin compound, an amine type epoxy compound obtained by condensation of a primary or secondary diamine compound with an epihalohydrin compound, and an aliphatic multivalent epoxy compound such as vinylcyclohexene diepoxide or the like, but are not restricted only to these exemplified compounds. These epoxy resins may be used singly, or two or more kinds thereof may be used in combination.

Examples of the organic acid and its anhydride which can be added as a resin modifier include thiodiglycolic acid, thiodipropionic acid, dithiodipropionic acid, phthalic anhydride, hexahydrophthalic anhydride, methylhexahydrophthalic anhydride, methyltetrahydrophthalic anhydride, methylnorbornene anhydride, methylnorbornene anhydride, maleic anhydride, trimellitic anhydride, pyromellitic anhydride and the like, but are not restricted only to these exemplified compounds. These organic acids and anhydrides thereof may be used singly, or two or more kinds thereof may be used in combination.

Examples of the olefin compound which can be added as a resin modifier include (meth)acrylate compounds such as benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentylglycol diacrylate, neopentylglycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methylthio acrylate, methylthio methacrylate, phenylthio acrylate, benzylthio methacrylate, xylylenedithiol diacrylate, xylylenedithiol dimethacrylate, mercaptoethyl sulfide diacrylate, mercaptoethylsulfide dimethacrylate and the like;

allyl compounds such as allyl glycidyl ether, diallyl phthalate, diallyl terephthalate, diallyl isophthalate, diallyl carbonate, diethylene glycol bisallylcarbonate and the like; and vinyl compounds such as styrene, chlorostyrene, methylstyrene, bromostyrene, dibromostyrene, divinylbenzene, 3,9-divinylspirobi(m-dioxane) and the like, but are not restricted only to these exemplified compounds. These olefin compounds may be used singly, or two or more compounds may be used in combination.

Next, a process for producing the polythiourethane resin of the present invention will be described.

In the present invention, the ratio of isocyanates and the active hydrogen compounds used as a raw material including the raw material containing a hydroxy compound as a modifier may be such that the molar ratio of functional groups, (NCO+NCS)/(SH+OH), is usually in the range of 0.5 to 3.0, preferably in the range of 0.6 to 2.0 and further preferably in the range of 0.8 to 1.3.

At the time of molding the polythiourethane resin of the present invention, a variety of substances such as a chain extender, a cross-linking agent, a light stabilizer, an ultraviolet absorber, an anti-oxidant, an anti-coloring agent, an oil-soluble dye, a filler, an external or internal mold release agent, an adhesion improving agent or the like may be added, depending on the purpose, as in the known molding methods. When a plastic lens is produced by using the polythiourethane resin of the present invention, it is usually obtained by the casting polymerization. However, it is preferable that an internal mold release agent including typical examples of phosphoric acid esters is in advance added to the polymerizable composition after the polymerization in order to accelerate releasing of the lens from the mold. Or, the mold can be treated with an external mold release agent in advance.

In the case of the polythiourethane resin, since an inorganic compound having a sulfur atom or a selenium atom easily causes the remarkable deterioration of color hue or turbidity, the content of these inorganic compounds in the polymerizable composition for polythiourethane optical materials is preferably not more than 1 weight %.

A mixing method of monomers will be described below. In the present invention, when isocyanates, the active hydrogen compounds, a reaction catalyst, a mold release agent and other additives are mixed before the polymerization to produce a polymerizable composition, the procedure of the catalyst, the mold release agent and other additives to be added is different depending on the solubility into monomers. However, they may be previously added to isocyanates and dissolved therein, added to the active hydrogen compounds and dissolved therein, or added to a mixture of the isocyanates and the active hydrogen compounds and dissolved therein. Or, they may be dissolved in a part of monomers in use to prepare a master solution, and then the master solution may be added.

The procedure of addition is not restricted to these exemplified methods, and properly selected depending on the operability, safety, expediency or the like.

For example, when the aforementioned zinc dialkyldithiocarbamate of zincs is used as the compound of the general formula (1) without using the compound of the general formula (2), preferably used is a method in which the reaction catalyst, the mold release agent and other additives are added to isocyanates in advance and dissolved therein, or dissolved in a part of isocyanates to prepare a master solution and then the master solution is added.

Furthermore, for example, when both of the compound of the general formula (1) and the compound of the general formula (2) are used together, and zinc N,N-dibutyldithiocarbamate is used as the compound of the general formula (1) and tetrabutylammonium chloride is used as the compound of the general formula (2), the following production procedures can be cited, but are not restricted only to these exemplified methods:

(1) a production procedure of mixing zinc N,N-dibutyldithiocarbamate, tetrabutylammonium chloride, a resin modifier and other additives with isocyanates, and then adding active hydrogen compounds thereto;

(2) a production procedure of mixing zinc N,N-dibutyldithiocarbamate, a resin modifier and other additives with isocyanates, and then adding the active hydrogen compounds with tetrabutylammonium chloride dissolved therein;

(3) a production procedure of mixing zinc N,N-dibutyldithiocarbamate, a resin modifier and other additives with isocyanates, and then adding the active hydrogen compounds, and finally adding tetrabutylammonium chloride or a master solution with tetrabutylammonium chloride dissolved in a part of monomers;

(4) a production procedure of mixing tetrabutylammonium chloride, a resin modifier and other additives with isocyanates, and then adding the active hydrogen compounds with zinc N,N-dibutyldithiocarbamate dissolved therein;

(5) a production procedure of mixing tetrabutylammonium chloride, a resin modifier and other additives with isocyanates, and then adding the active hydrogen compounds, and finally adding zinc N,N-dibutyldithiocarbamate or a master solution with zinc N,N-dibutyldithiocarbamate dissolved in a part of monomers;

(6) a production procedure of mixing a resin modifier and other additives with isocyanates, and then adding the active hydrogen compounds with zinc N,N-dibutyldithiocarbamate and tetrabutylammonium chloride dissolved therein;

(7) a production procedure of mixing a resin modifier and other additives with isocyanates, and then adding the active hydrogen compounds with zinc N, N-dibutyldithiocarbamate dissolved therein, and finally adding tetrabutylammonium chloride or a master solution with tetrabutylammonium chloride dissolved in a part of monomers;

(8) a production procedure of mixing a resin modifier and other additives with isocyanates, and then adding the active hydrogen compounds with tetrabutylammonium chloride dissolved therein, and finally adding zinc N,N-dibutyldithiocarbamate or a master solution with zinc N,N-dibutyldithiocarbamate in a part of monomers;

(9) a production procedure of mixing a resin modifier and other additives with isocyanates, and then adding the active hydrogen compounds, and finally adding zinc N,N-dibutyldithiocarbamate and tetrabutylammonium chloride or a master solution with zinc N,N-dibutyldithiocarbamate and tetrabutylammonium chloride dissolved in a part of monomers; and

(10) a production procedure of mixing isocyanates, active hydrogen compounds, zinc N,N-dibutyldithiocarbamate, tetrabutylammonium chloride, a resin modifier and other additives at a time without conducting the aforementioned mixing procedure step by step.

As a type of adding a catalyst, a catalyst itself may be added, and a master solution may be prepared by dissolving the catalyst in a part of monomers in use and then the master solution may be added.

When the isocyanates and the active hydrogen compounds are mixed with a reaction catalyst, an internal mold release agent or other additives to produce a polymerizable composition, the temperature at that time is usually not more than 25 degree centigrade. From the viewpoint of the pot life of the composition, it is sometimes preferable to employ a further lower temperature. However, when the solubility of a reaction catalyst, a mold release agent or additives into monomers is not good, the reaction catalyst, the mold release agent or additives can be dissolved in the monomer isocyanates, the monomer active hydrogen compounds or in a monomer mixture by heating in advance.

As a typical polymerization method for obtaining the polythiourethane resin (for example, plastic lens) of the present invention from the thus obtained monomer mixed composition, casting polymerization can be cited. Namely, the polymerizable composition according to the present invention is injected between molds held by a gasket, tapes or the like. At this time, depending on the requirement for physical properties of the obtained plastic lens, a degassing process under a reduced pressure or a filtration process such as under an applied pressure, a reduced pressure or the like may be preferably employed as necessary in many cases. Subsequently, the mold can be subjected to curing by heating in a heating apparatus such as an oven or in water, and then the resin can be taken out therefrom.

In order to obtain the transparent resin, the type or amount of reaction catalysts or the like, and the type or ratio of monomers are different depending on the configuration of the composition subjected to polymerization, and are not absolutely restricted. However, the aforementioned conditions are preferred in many cases.

Heat polymerization conditions of the composition of the present invention injected into the mold significantly vary depending on composition of the polymerizable composition of the present invention, the type of reaction catalysts, the shape of molds or the like and therefore are not restricted. However, polymerization is conducted at a temperature of about −50 to 200 degree centigrade over 1 to 100 hours. In some cases, the composition is preferably polymerized by keeping or gradually raising the temperature in the range of 10 to 130 degree centigrade for 1 to 24 hours.

In addition, the resin which has been taken out from the mold, may be, if necessary, annealed or the like. The annealing temperature is usually from 50 to 200 degree centigrade, preferably from 90 to 150 degree centigrade and more preferably from 100 to 130 degree centigrade.

The resin obtained by curing the composition for optical materials according to the present invention is a resin excellent in color hue. The transparent resin of the present invention can be obtained as a molded article in various shapes by changing the mold at the time of casting polymerization and can be used for various applications as optical resins of spectacle lenses, camera lenses, light emitting diodes (LED) and the like. In particular, the transparent resins are suitable as optical materials or optical elements of spectacle lenses, camera lenses, light emitting diodes and the like.

In the plastic lens using the polythiourethane resin of the present invention, for purposes of improving anti-reflection, granting high hardness, improving wear resistance, improving chemical resistance, granting anti-clouding property, granting fashionability and photochromic properties, or the like, physical or chemical processes such as surface polishing, an antistatic process, a coating process on one surface or both surfaces, a tinting process, a photochromic process or the like can be performed as necessary.

Examples of a coating layer formed by the coating process include a primer layer, a hard coat layer, an anti-reflection film layer, an anti-clouding coating film layer, an anti-fouling layer, a water repelling layer and the like. These coating layers may be each used singly or a plurality of coating layers may be used in a multi-layered structure. When the coating layers are applied on both surfaces of the lens, the same coating layer or different coating layers may be applied on each surface.

These coating layers may be each used together with an ultraviolet absorber for the purpose of protecting lenses or eyes from ultraviolet rays, an infrared ray absorber for the purpose of protecting eyes from infrared rays, a light stabilizer or an anti-oxidant for the purpose of improving weather resistance of lenses, a dye or a pigment for the purpose of enhancing fashionability of lenses, and a photochromic dye or a photochromic pigment, an anti-static agent and other known additives for improving the property of lenses. For the layer to be coated by the coating process, various leveling agents may be used for the purpose of improving the coating property.

The primer layer is usually formed between a hard coat layer to be described below and an optical lens. The primer layer is a coating layer for the purpose of improving adhesion between the hard coat layer to be formed thereon and the lens, and impact resistance of the lens can also be improved in some cases.

Any material can be used for the primer layer as long as it has high adhesion to the obtained optical lens. Normally, a primer composition containing a urethane-based resin, an epoxy-based resin, a polyester-based resin, a melanin-based resin, a polyvinyl acetal and the like as the main component is used. A suitable solvent which does not influence on the lens may be used in the primer composition for the purpose of adjusting the viscosity of the composition. Or, any solvent may not be employed.

The primer composition can be formed by any method of a coating method or a dry method. When the coating method is employed, the lens is coated by a known coating method such as spin coating, dip coating or the like, and then solidified to form a primer layer. When the dry method is employed, the lens is formed by a known dry method such as a CVD method, a vacuum deposition method or the like. Upon forming a primer layer, for the purpose of improving adhesion of the primer layer, the surface of the lens may be subjected to a pre-treatment such as an alkaline treatment, a plasma treatment, an ultraviolet treatment or the like as necessary.

The hard coat layer refers to a coating layer for the purpose of providing the surface of the lens with functions such as abrasion resistance, wear resistance, humidity resistance, hot water resistance, heat resistance, weather resistance and the like.

As the hard coat layer, in general, there is used a hard coat composition containing an organic silicon compound having curing properties and one or more fine particles formed from one or more fine oxide particles of an element selected from the element group of Si, Al, Sn, Sb, Ta, Ce, La, Fe, Zn, W, Zr, In and Ti, and/or composite oxides of two or more elements selected from the element group. It is preferable that the hard coat composition contains at least one of amines, amino acids, complex of metal acetylacetonate, metal salts of organic acid, perchloric acids, salts of perchloric acids, acids, metal chlorides and polyfunctional epoxy compounds, in addition to the aforementioned components. A suitable solvent which does not influence on the lens may be used in the hard coat composition. Alternatively, any solvent may not be employed.

The hard coat layer is usually formed by applying the hard coat composition according to the known coating methods such as spin coating, dip coating or the like, and then curing the resulting material. As a curing method, a method for curing by thermal curing, or irradiation with energy beams such as ultraviolet rays, visible rays or the like can be cited. Since generation of interference fringes is suppressed, the difference between the refractive index of the hard coat layer and the refractive index of the lens is preferably in the range of ±0.1.

An anti-reflection layer is usually formed on the aforementioned hard coat layer as needed. As the anti-reflection layer, there are inorganic-based layers and organic-based layers. In the case of the inorganic-based layer, the layer is formed by a dry method such as a vacuum deposition method, a sputtering method, an ion plating method, an ion beam assisted deposition, a CVD method or the like by using an inorganic oxide such as $SiO_2$, $TiO_2$ or the like. In the case of the organic-based layer, the layer is formed by a wet method using an organic silicon compound and a composition containing silica-based fine particles having internal pores.

The anti-reflection layer is composed of a single layer or multi layers. When using as a single layer, it is preferable that its refractive index is lower by at least 0.1 or more than that of the hard coat layer. In order to effectively develop anti-reflection function, a multi-layered anti-reflection film is preferable. In this case, a low refractive index film and a high refractive index film are alternately laminated. In this case, it is also preferable that the difference between the refractive index of the low refractive index film and that of the high refractive index film is not less than 0.1. As the high refractive index film, films of ZnO, $TiO_2$, $CeO_2$, $Sb_2O_5$, $SnO_2$, $ZrO_2$, $Ta_2O_5$ and the like can be cited. As the low refractive index film, $SiO_2$ films and the like can be cited.

On the anti-reflection film layer, an anti-clouding coating film layer, an anti-fouling layer or a water repelling layer may be formed as necessary. As long as a method for forming an anti-clouding coating layer, an anti-fouling layer or a water repelling layer does not adversely affect the anti-reflection function, its treating methods, treating materials and the like are not particularly limited. Known anti-clouding coating treating methods, anti-fouling treating methods, water repelling treating methods, materials and the like can be used. For example, in the anti-clouding coating treating method and anti-fouling treating method, there can be exemplified a method for covering the surface with a surface active agent, a method for adding a hydrophilic film to the surface for the water absorbent property, a method for covering the surface with fine mountains and valleys for enhancing water absorbent property, a method for water absorbent property by using photocatalytic activity, a method for conducting an ultra-water repelling treatment to prevent attachment of waterdrop and the like. Furthermore, as the water repelling treating method, there can be exemplified a method for forming a water repelling treatment layer by subjecting a fluorine-containing silane compound or the like to deposition or sputtering, a method for forming a water repelling treatment layer by dissolving the fluorine-containing silane compound in a solvent and then coating or the like.

The lens can be tinted by a known tinting method. However, it is usually tinted in the following methods: (1) a method including immersing the lens in a dye solution; (2) a method including coating by using a coating agent containing a dye or a method including forming a coating layer capable of tinting and tinting the coating layer; (3) a method including adding a material capable of tinting to a raw material monomer for polymerization; and (4) a method including heating a sublimation dye for sublimation.

The method in (1) generally refers to a method including immersing a prescribed optical surface-finished lens material in a dye solution with a dye in use dissolved or homogeneously dispersed therein (tinting process) and then, as required, heating the lens to solidify the dye (annealing process after tinting) The dye used in the tinting process is not particularly limited as long as it is a known dye. However, an oil soluble dyestuff or a disperse dye is usually used. The solvent used in the tinting process is not particularly limited as far as the dye in use can be dissolved or homogeneously dispersed therein. In this tinting process, a surface active agent for dispersing a dye in the dye solution or a career for promoting tinting may be added as required. The tinting process includes dispersing a pigment and a surface active agent to be added as needed in water or a mixture of water and an organic solvent to prepare a dye bath, immersing the optical lens in the dye bath and tinting at a prescribed temperature for a prescribed period. The dye temperature and period vary depending on the desired coloring concentration, but usually not more than 120 degree centigrade and about several minutes to several tens of hours. The dye concentration of the dye bath is from 0.01 to 10 weight %. Furthermore, when it is difficult to tint, it may be carried out under an applied pressure. The annealing process after tinting conducted as required is a process for heating the dyed lens material. The heating process is carried out such that water remained on the surface of the lens material tinted in the tinting process is removed using a solvent or the like, or the solvent is air dried, and then remained, for example, in a furnace such as an infrared heating furnace, a resistance heating furnace or the like in an ambient atmosphere for a prescribed period. The annealing process after tinting includes preventing the decolorization of the dyed lens material (decolorization-preventing process) and at the same time eliminating water penetrated into the inside of the lens material at the time of tinting.

The method in (2) refers to a method including applying an organic coating solution in which a pigment is dispersed or dissolved to the plastic lens without directly tinting the plastic lens material, and then curing for forming a dyed coating layer on the lens surface, or a method including adopting the method in (1) after forming a coating layer capable of tinting on the surface of the plastic lens, that is, immersing the plastic lens in a dye solution and heating for tinting.

The method in (3) refers to a method for previously dissolving a dye in a raw material monomer of the plastic lens for polymerization. The pigment in use is not particularly limited as far as it is capable of being homogeneously dissolved in a raw material monomer or dispersed to the extent that the optical property is not damaged.

As the method in (4), there are (a) a method including sublimate a solid sublimation pigment for tinting the plastic lens, (b) a method including putting a base obtained by applying a solution containing the sublimation pigment opposite to the plastic lens at a non-contact state, and heating the base and the lens for tinting, and (c) a method including transferring a transfer layer composed of a coloring layer containing a sublimation pigment and an adhesive layer onto the plastic lens and then heating for tinting. The optical lens of the present invention may be dyed by any of these methods. The pigment in use is not particularly limited as far as it is a pigment having a sublimation property.

EXAMPLES

The present invention is now illustrated in detail below with reference to Examples. However, the present invention is not restricted to these Examples.

The catalytic activity, transparency of a resin, tests of the performance (color, refractive index, Abbe number and heat resistance) and weather resistance of a lens were evaluated by the following testing method.

Catalytic activity: The polymerizable composition containing isocyanates, thiols, catalysts and additives was kept at 20 degree centigrade for 5 hours and then its viscosity (mPa·s) was measured by using a B-type viscometer. The higher the obtained viscosity was, the higher the catalytic activity was determined.

Transparency of resin: The obtained resin was irradiated using a projector at a dark place, and existence of lenticular cloud and non-transparent substance was visually determined. o indicates lenses without having any lenticular cloud and non-transparent substance (with transparency), while x indicates those with lenticular cloud and non-transparent substance (no transparency).

Color (Yellow Index): Using a colorimeter (CR-200) manufactured by Minolta, a resin color (YI) value was measured. The resin color (YI) value was measured by preparing a circular flat plate having a thickness of 9 mm and a diameter of φ75 mm.

Refractive index (ne) and Abbe number (ve): Measured at 20 degree centigrade using a Pulfrich refractometer.

Heat resistance: Tg (degree centigrade) of the TMA penetration method (load: 50 g, pinpoint: 0.5 mmΦ, temperature elevation rate: 10 degree centigrade/min) was measured as heat resistance.

Weather resistance: The change of the resin color (YI) value was observed by irradiating the resin with an artificial sunlight (illuminance: 88400 lx/h) for 7 days. The smaller an increase in the YI value (ΔYI) was, the better weather resistance was.

Example 1

0.0084 g (120 ppm based on the total weight of the polymerizable composition) of zinc N,N-di-n-butyldithiocarbamate, 0.070 g of an internal mold release agent (STEPAN Company, product name: Zelec UN) and 0.035 g of an ultraviolet absorber (Kyodo Chemical Co., Ltd., product name: viosorb 583) were mixed and dissolved in 36.4 g of m-xylylene diisocyanate at 20 degree centigrade to give a homogeneous solution. To this homogeneous solution was added 33.6 g of 4-mercaptomethyl-1,8-dimercapto-3,6-dithiaoctane, and the mixture was mixed and dissolved at 20 degree centigrade. This mixed solution was degassed under 400 Pa for 1 hour, and then filtered through a 1-µm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.665, Abbe number (ve) of 31.8, heat resistance (Tg) of 88.9 degree centigrade and color (YI) of 5.1. It was suitable as an optical transparent resin. Weather resistance (ΔYI) was 1.21. As for the catalytic activity, the viscosity of the polymerizable composition measured after it was kept at 20 degree centigrade for 5 hours was 61 mPa·s. The evaluation results were shown in Table 1.

Example 2

A resin was polymerized and annealed in the same manner as in Example 1 by using 0.0035 g (50 ppm based on the total weight of the polymerizable composition) of zinc N,N-dimethyldithiocarbamate instead of zinc N,N-di-n-butyldithiocarbamate in Example 1. The obtained resin had transparency. Further, it had a refractive index (ne) of 1.665, Abbe number (ve) of 31.4, heat resistance (Tg) of 88.3 degree centigrade and color (YI) of 5.5. It was suitable as an optical transparent resin. Weather resistance (ΔYI) was 1.24. As for the catalytic activity, the viscosity of the polymerizable composition measured after it was kept at 20 degree centigrade for 5 hours was 75 mPa·s. The evaluation results were shown in Table 1.

Example 3

A resin was polymerized and annealed in the same manner as in Example 1 by using 0.0084 g (120 ppm based on the total weight of the polymerizable composition) of zinc N-ethyl-N-phenyldithiocarbamate instead of zinc N,N-di-n-butyldithiocarbamate in Example 1. The obtained resin had transparency. Further, it had a refractive index (ne) of 1.665, Abbe number (ve) of 31.3, heat resistance (Tg) of 89.1 degree centigrade and color (YI) of 6.7. It was suitable as an optical transparent resin. Weather resistance (ΔYI) was 1.43. As for the catalytic activity, the viscosity of the polymerizable composition measured after it was kept at 20 degree centigrade for 5 hours was 84 mPa·s. The evaluation results were shown in Table 1.

Example 4

0.0035 g (50 ppm based on the total weight of the polymerizable composition) of zinc N,N-di-n-butyldithiocarbamate, 0.070 g of an internal mold release agent (STEPAN Company, product name: Zelec UN) and 0.035 g of an ultraviolet absorber (Kyodo Chemical Co., Ltd., product name: viosorb 583) were mixed and dissolved in 35.5 g of m-xylylene diisocyanate at 20 degree centigrade to give a homogeneous solution. To this homogeneous solution was added 34.5 g of a mixture of 5,7-dimercaptomethyl-1,1'-dimercapto-3,6,9-trithiaundecane, 4,7-dimercaptomethyl-1,1'-dimercapto-3,6,9-trithiaundecane and 4,8-dimercaptomethyl-1,1'-dimercapto-3,6,9-trithiaundecane, and the mixture was mixed and dissolved at 20 degree centigrade. This mixed solution was degassed under 400 Pa for 1 hour, and then filtered through a 1-µm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.669, Abbe number (κe) of 31.6, heat resistance (Tg) of 103.6 degree centigrade and color (YI) of 5.5. It was suitable as an optical transparent resin. Weather resistance (ΔYI) was 1.62. As for the catalytic activity, the viscosity of the polymerizable composition measured after it was kept at 20 degree centigrade for 5 hours was 132 mPa·s. The evaluation results were shown in Table 1.

Example 5

0.0091 g (130 ppm based on the total weight of the polymerizable composition) of zinc N,N-di-n-butyldithiocarbamate, 0.210 g of an internal mold release agent (phosphoric acid di(2-ethylhexyl)) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.597, Abbe number (κe) of 40.4, heat resistance (Tg) of 117.7 degree centigrade and color (YI) of 3.9. It was suitable as an optical transparent resin. Weather resistance (ΔYI) was 0.87. As for the catalytic activity, the viscosity of the polymerizable composition measured after it was kept at 20 degree centigrade for 5 hours was 60 mPa·s. The evaluation results were shown in Table 1.

Example 6

0.0035 g (50 ppm based on the total weight of the polymerizable composition) of zinc N,N-di-n-butyldithiocarbamate, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane in which 0.0280 g (400 ppm based on the total weight of the polymerizable composition, molar ratio of the compound of the general formula (2) to the compound of the general formula (1) of 13.6) of tetrabutylammonium chloride was dissolved, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 40.6, heat resistance (Tg) of 118.2 degree centigrade and color (YI) of 3.9. It was suitable as an optical transparent resin. Weather resistance (ΔYI) was 0.63. The viscosity of the polymerizable composition measured after it was kept at 20 degree centigrade for 5 hours was 113 mPa·s. The evaluation results were shown in Table 1.

Example 7

0.0035 g (50 ppm based on the total weight of the polymerizable composition) of zinc N,N-di-n-butyldithiocarbamate, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane in which 0.0140 g (200 ppm based on the total weight of the polymerizable composition, molar ratio of the compound of the general formula (2) to the compound of the general formula (1) of 5.9) of tetrabutylammonium bromide was dissolved, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 40.6, heat resistance (Tg) of 118.6 degree centigrade and color (YI) of 4.1. It was suitable as an optical transparent resin. Weather resistance (ΔYI) was 0.53. The viscosity of the polymerizable composition measured after it was kept at 20 degree centigrade for 5 hours was 114 mPa·s. The evaluation results were shown in Table 1.

Comparative Example 1

0.0105 g (150 ppm based on the total weight of the polymerizable composition) of di-n-butyltin dichloride, 0.070 g of an internal mold release agent (STEPAN Company, product name: Zelec UN) and 0.035 g of an ultraviolet absorber (Kyodo Chemical Co., Ltd., product name: viosorb 583) were mixed and dissolved in 36.4 g of m-xylylene diisocyanate at 20 degree centigrade to give a homogeneous solution. To this homogeneous solution was added 33.6 g of 4-mercaptomethyl-1,8-dimercapto-3,6-dithiaoctane, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.665, Abbe number (ve) of 31.7, heat resistance (Tg) of 87.9 degree centigrade and color (YI) of 5.2. It was suitable as an optical transparent resin. Weather resistance (ΔYI) was 2.37. As for the catalytic activity, the viscosity of the polymerizable composition measured after it was kept at 20 degree centigrade for 5 hours was 78 mPa·s. The evaluation results were shown in Table 1.

Comparative Example 2

0.0070 g (100 ppm based on the total weight of the polymerizable composition) of di-n-butyltin dichloride, 0.070 g of an internal mold release agent (STEPAN Company, product name: Zelec UN) and 0.035 g of an ultraviolet absorber (Kyodo Chemical Co., Ltd., product name: viosorb 583) were mixed and dissolved in 35.5 g of m-xylylene diisocyanate at 20 degree centigrade to give a homogeneous solution. To this homogeneous solution was added 34.5 g of a mixture of 5,7-dimercaptomethyl-1,1'-dimercapto-3,6,9-trithiaundecane, 4,7-dimercaptomethyl-1,1'-dimercapto-3,6,9-trithiaundecane and 4,8-dimercaptomethyl-1,1'-dimercapto-3,6,9-trithiaundecane, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.669, Abbe number (ve) of 31.6, heat resistance (Tg) of 104.8 degree centigrade and color (YI) of 5.3. It was suitable as an optical transparent resin. Weather resistance (ΔYI) was 2.51. As for the catalytic activity, the viscosity of the polymerizable composition measured after it was kept at 20 degree centigrade for 5 hours was 103 mPa·s. The evaluation results were shown in Table 1.

Comparative Example 3

0.014 g (200 ppm based on the total weight of the polymerizable composition) of di-n-butyltin dichloride, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.597, Abbe number (ve) of 40.6, heat resistance (Tg) of 118.1 degree centigrade and color (YI) of 3.8. It was suitable as an optical transparent resin. Weather resistance (ΔYI) was 1.01. As for the catalytic activity, the viscosity of the polymerizable composition measured after it was kept at 20 degree centigrade for 5 hours was 61 mPa·s. The evaluation results were shown in Table 1.

TABLE 1

| | Isocyanates (g) | Active hydrogen compound (g) | General formula (1) (ppm) note 1 (mmol) | General formula (2) (ppm) note 2 | Catalytic activity (mPa · s) | Color YI | Refractive index (ne) | Abbe number (ve) | Heat resistance (° C.) | Transparency | Weather resistance (ΔYI) |
|---|---|---|---|---|---|---|---|---|---|---|---|
| Example 1 | m-xylylene diisocyanate (36.4) | 4-mercapto methyl-1,8-dimercapto-3,6-dithia octane (33.6) | ZnBTC (120) (0.0177) | — | 61 | 5.1 | 1.665 | 31.8 | 88.9 | ○ | 1.21 |
| Example 2 | m-xylylene diisocyanate (36.4) | 4-mercapto methyl-1,8-dimercapto-3,6-dithia octane (33.6) | ZnMTC (50) (0.0114) | — | 75 | 5.5 | 1.665 | 31.4 | 88.3 | ○ | 1.24 |
| Example 3 | m-xylylene diisocyanate (36.4) | 4-mercapto methyl-1,8-dimercapto-3,6-dithia octane (33.6) | ZnEPTC (120) (0.0183) | — | 84 | 6.7 | 1.665 | 31.3 | 89.1 | ○ | 1.43 |
| Example 4 | m-xylylene diisocyanate (35.5) | Mixture of 5,7-dimercapto methyl-1,11-dimercapto-3,6,9-trithia undecane, 4,7-dimercapto | ZnBTC (50) (0.0074) | — | 132 | 5.5 | 1.669 | 31.6 | 103.6 | ○ | 1.62 |

TABLE 1-continued

| | Isocyanates (g) | Active hydrogen compound (g) | General formula (1) (ppm) note 1 (mmol) | General formula (2) (ppm) note 2 | Catalytic activity (mPa·s) | Color YI | Refractive index (ne) | Abbe number (ve) | Heat resistance (°C.) | Transparency | Weather resistance (ΔYI) |
|---|---|---|---|---|---|---|---|---|---|---|---|
| | | methyl-1,11-dimercapto-3,6,9-trithia undecane and 4,8-dimercapto methyl-1,11-dimercpato-3,6,9-trithia undecane (34.5) | | | | | | | | | |
| Example 5 | Mixture of 2,5-bis (isocyanato methyl)-bicyclo [2.2.1] heptane and 2,6-bis (isocyanato methyl)-bicyclo [2.2.1] heptane (35.4) | 4-mercapto methyl-1,8-dimercapto-3,6-dithia octane (17.9) penta erythritol tetrakis (3-mercapto propionate) (16.7) | ZnBTC (130) (0.0192) | — | 60 | 3.9 | 1.597 | 40.4 | 117.7 | ○ | 0.87 |
| Example 6 | Mixture of 2,5-bis (isocyanato methyl)-bicyclo [2.2.1] heptane and 2,6-bis (isocyanato methyl)-bicyclo [2.2.1] heptane (35.4) | 4-mercapto methyl-1,8-dimercapto-3,6-dithia octane (17.9) penta erythritol tetrakis (3-mercapto propionate) (16.7) | ZnBTC (50) (0.0074) | TBAC (400) | 113 | 3.9 | 1.598 | 40.6 | 118.2 | ○ | 0.63 |
| Example 7 | Mixture of 2,5-bis (isocyanato methyl)-bicyclo [2.2.1] heptane and 2,6-bis (isocyanato methyl)-bicyclo [2.2.1] heptane (35.4) | 4-mercapto methyl-1,8-dimercapto-3,6-dithia octane (17.9) penta erythritol tetrakis (3-mercapto propionate) (16.7) | ZnBTC (50) (0.0074) | TBAB (200) | 114 | 4.1 | 1.598 | 40.6 | 118.6 | ○ | 0.53 |
| Comparative Example 1 | m-xylylene diisocyanate (36.4) | 4-mercapto methyl-1,8-dimercapto-3,6-dithia octane (33.6) | DBC (150) (0.0346) | — | 78 | 5.2 | 1.665 | 31.7 | 87.9 | ○ | 2.37 |
| Comparative Example 2 | m-xylylene diisocyanate (35.5) | Mixture of 5,7-dimercapto methyl-1,11-dimercapto-3,6,9-trithia undecane, 4,7-dimercapto methyl-1,11-dimercapto-3,6,9-trithia undecane and 4,8-dimercapto methyl-1,11-dimercpato- | DBC (100) (0.0230) | — | 103 | 5.3 | 1.669 | 31.6 | 104.8 | ○ | 2.51 |

TABLE 1-continued

| | Isocyanates (g) | Active hydrogen compound (g) | General formula (1) (ppm) note 1 (mmol) | General formula (2) (ppm) note 2 | Catalytic activity (mPa·s) | Color YI | Refractive index (ne) | Abbe number (ve) | Heat resistance (°C.) | Transparency | Weather resistance (ΔYI) |
|---|---|---|---|---|---|---|---|---|---|---|---|
| Comparative Example 3 | Mixture of 2,5-bis(isocyanato methyl)-bicyclo[2.2.1]heptane and 2,6-bis(isocyanato methyl)-bicyclo[2.2.1]heptane (35.4) | 3,6,9-trithia undecane (34.5) 4-mercapto methyl-1,8-dimercapto-3,6-dithia octane (17.9) penta erythritol tetrakis (3-mercapto propionate) (16.7) | DBC (200) (0.0460) | — | 61 | 3.8 | 1.597 | 40.6 | 118.1 | ○ | 1.01 |

Notes 1 and 2:
The amount (ppm) of the compound of the general formula (1) and the compound of the general formula (2) added is a value based on the total weight of the polymerizable composition.
ZnBTC: zinc N,N-di-n-butyldithiocarbamate
ZnMTC: zinc N,N-dimethyldithiocarbamate
ZnEPTC: zinc N-ethyl-N-phenyldithiocarbamate
TBAC: tetrabutylammonium chloride
TBAB: tetrabutylammonium bromide
DBC: di-n-butyltin dichloride In Examples 1, 2 and 3, weather resistances (ΔYI) were 1.21, 1.24 and 1.43 which were good as compared to ΔYI of 2.37 of the di-n-butyltin dichloride catalyst of Comparative Example 1. As for the catalytic activity, the viscosities of the polymerizable compositions measured after the compositions were kept at 20 degree centigrade for 5 hours were 61, 75 and 84 mPa·s. As compared to the di-n-butyltin dichloride catalyst of Comparative Example 1, the compound of the general formula (1) exhibited catalytic activity equal to that of the di-n-butyltin dichloride catalyst with its small weight and mole number (zinc N,N-di-n-butyldithiocarbamate: 0.0177 mmol, zinc N,N-dimethyldithiocarbamate: 0.0114 mmol and zinc N-ethyl-N-phenyldithiocarbamate: 0.0183 mmol, based on di-n-butyltin dichloride: 0.0346 mmol). The color hue, refractive index, heat resistance and Abbe number of the resin obtained by heat curing were also equal thereto.

In Example 4, weather resistance (ΔYI) was 1.62 which was good as compared to ΔYI of 2.51 of the di-n-butyltin dichloride catalyst of Comparative Example 2. As for the catalytic activity, the viscosity of the polymerizable composition measured after it was kept at 20 degree centigrade for 5 hours was 132 mPa·s. As compared to the di-n-butyltin dichloride catalyst of Comparative Example 2, the compound of the general formula (1) exhibited catalytic activity equal to or superior to that of the di-n-butyltin dichloride catalyst with its small weight and mole number (zinc N,N-di-n-butyldithiocarbamate: 0.0074 mmol, based on di-n-butyltin dichloride: 0.0230 mmol). The color hue, refractive index, heat resistance and Abbe number of the resin obtained by heat curing were also equal thereto.

In Example 5, weather resistance (ΔYI) was 0.87 which was good as compared to ΔYI of 1.01 of the di-n-butyltin dichloride catalyst of Comparative Example 3. As for the catalytic activity, the viscosity of the polymerizable composition measured after it was kept at 20 degree centigrade for 5 hours was 60 mPa·s. As compared to the di-n-butyltin dichloride catalyst of Comparative Example 3, the compound of the general formula (1) exhibited catalytic activity equal to that of the di-n-butyltin dichloride catalyst with its small weight and mole number (zinc N,N-di-n-butyldithiocarbamate: 0.0192 mmol, based on di-n-butyltin dichloride: 0.0460 mmol). The color hue, refractive index, heat resistance and Abbe number of the resin obtained by heat curing were also equal thereto.

In Examples 6 and 7, weather resistances (ΔYI) were 0.63 and 0.53, which were good as compared to ΔYI of 1.01 of the di-n-butyltin dichloride catalyst of Comparative Example 3. As for the catalytic activity, the viscosities of the polymerizable compositions measured after the compositions were kept at 20 degree centigrade for 5 hours were 113 and 114 mPa·s. As compared to the di-n-butyltin dichloride catalyst of Comparative Example 3, the compound of the general formula (1) exhibited catalytic activity equal to or superior to that of the di-n-butyltin dichloride catalyst with its small weight and mole number (zinc N,N-di-n-butyldithiocarbamate: 0.0074 mmol, based on di-n-butyltin dichloride: 0.0460 mmol). The color hue, refractive index, heat resistance and Abbe number of the resin obtained by heat curing were also equal thereto.

Example 8

0.0046 g (65 ppm based on the total weight of the polymerizable composition) of zinc N,N-di-n-butyldithiocarbamate, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane in which 0.0046 g (65 ppm based on the total weight of the polymerizable composition, molar ratio of the compound of the general formula (2) to the compound of the general formula (1) of 1.7) of tetrabutylammonium chloride was dissolved, and the mixture was mixed and dissolved at 20 degree centigrade. This mixed solution was degassed under 400 Pa for 1 hour, and then filtered through a 1-µm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 41, heat resistance (Tg) of 118 degree centigrade and color (YI) of 4.3. It was suitable as an optical transparent resin. The viscosity of the polymerizable composition measured after it was kept at 20 degree centigrade for 5 hours was 140 mPa·s. The evaluation results were shown in Table 2.

Example 9

0.0035 g (50 ppm based on the total weight of the polymerizable composition) of zinc N,N-di-n-butyldithiocarbamate, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane in which 0.028 g (400 ppm based on the total weight of the polymerizable composition, molar ratio of the compound of the general formula (2) to the compound of the general formula (1) of 11.8) of tetrabutylammonium bromide was dissolved, and the mixture was mixed and dissolved at 20 degree centigrade. This mixed solution was degassed under 400 Pa for 1 hour, and then filtered through a 1-µm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 41, heat resistance (Tg) of 119 degree centigrade and color (YI) of 4.1. It was suitable as an optical transparent resin. The viscosity of the polymerizable composition measured after it was kept at 20 degree centigrade for 5 hours was 180 mPa·s. The evaluation results were shown in Table 2.

Example 10

0.0035 g (50 ppm based on the total weight of the polymerizable composition) of zinc N,N-di-n-butyldithiocarbamate, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane in which 0.028 g (400 ppm based on the total weight of the polymerizable composition, molar ratio of the compound of the general formula (2) to the compound of the general formula (1) of 11.5) of tetrabutylammonium tetrafluoroborate was dissolved, and the mixture was mixed and dissolved at 20 degree centigrade. This mixed solution was degassed under 400 Pa for 1 hour, and then filtered through a 1-µm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 41, heat resistance (Tg) of 118 degree centigrade and color (YI) of 4.9. It was suitable as an optical transparent resin. The viscosity of the polymerizable composition measured after it was kept at 20 degree centigrade for 5 hours was 100 mPa·s. The evaluation results were shown in Table 2.

Example 11

0.0035 g (50 ppm based on the total weight of the polymerizable composition) of zinc N,N-di-n-butyldithiocarbamate, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane in which 0.028 g (400 ppm based on the total weight of the polymerizable composition, molar ratio of the compound of the general formula (2) to the compound of the general formula (1) of 18.0) of tetraethylammonium bromide was dissolved, and the mixture was mixed and dissolved at 20 degree centigrade. This mixed solution was degassed under 400 Pa for 1 hour, and then filtered through a 1-µm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 41, heat resistance (Tg) of 119 degree centigrade and color (YI) of 4.3. It was suitable as an optical transparent resin. The viscosity of the polymerizable composition measured after it was kept at 20 degree centigrade for 5 hours was 110 mPa·s. The evaluation results were shown in Table 2.

Example 12

0.0035 g (50 ppm based on the total weight of the polymerizable composition) of iron N,N-di-n-ethyldithiocarbamate, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane in which 0.0028 g (400 ppm based on the total weight of the polymerizable composition, molar ratio of the compound of the general formula (2) to the compound of the general formula (1) of 1.4) of tetrabutylammonium chloride was dissolved, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 41, heat resistance (Tg) of 119 degree centigrade and color (YI) of 4.7. It was suitable as an optical transparent resin. The viscosity of the polymerizable composition measured after it was kept at 20 degree centigrade for 5 hours was 130 mPa·s. The evaluation results were shown in Table 2.

Example 13

0.0046 g (65 ppm based on the total weight of the polymerizable composition) of zinc N,N-di-n-butyldithiocarbamate, 0.0067 g (95 ppm based on the total weight of the polymerizable composition, molar ratio of the compound of the general formula (2) to the compound of the general formula (1) of 1.7) of trioctylmethylammonium chloride, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.597, Abbe number (ve) of 41, heat resistance (Tg) of 117 degree centigrade and color (YI) of 4.2. It was suitable as an optical transparent resin. The viscosity of the polymerizable composition measured after it was kept at 20 degree centigrade for 5 hours was 80 mPa·s. The evaluation results were shown in Table 2.

Example 14

0.0046 g (65 ppm based on the total weight of the polymerizable composition) of zinc N,N-di-n-butyldithiocarbamate, 0.0053 g (75 ppm based on the total weight of the polymerizable composition, molar ratio of the compound of the general formula (2) to the compound of the general formula (1) of 1.8) of tributylbenzylammonium chloride, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.597, Abbe number (ve) of 41, heat resistance (Tg) of 117 degree centigrade and color (YI) of 4.2. It was suitable as an optical transparent resin. The viscosity of the polymerizable composition measured after it was kept at 20 degree centigrade for 5 hours was 88 mPa·s. The evaluation results were shown in Table 2.

Example 15

0.0014 g (20 ppm based on the total weight of the polymerizable composition) of zinc N,N-di-n-butyldithiocarbamate, 0.070 g of an internal mold release agent (STEPAN Company, product name: Zelec UN) and 0.035 g of an ultraviolet absorber (Kyodo Chemical Co., Ltd., product name: viosorb 583) were mixed and dissolved in 36.4 g of m-xylylene diisocyanate at 20 degree centigrade to give a homogeneous solution. To this homogeneous solution was added a mixed solution of 33.6 g of 4-mercaptomethyl-1,8-dimercapto-3,6-dithiaoctane in which 0.0140 g (200 ppm based on the total weight of the polymerizable composition, molar ratio of the compound of the general formula (2) to the compound of the general formula (1) of 14.7) of tetrabutylammonium bromide was dissolved, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.665, Abbe number (ve) of 32, heat resistance (Tg) of 88 degree centigrade and color (YI) of 5.5. It was suitable as an optical transparent resin. The viscosity of the polymerizable composition measured after it was kept at 20 degree centigrade for 5 hours was 89 mPa·s. The evaluation results were shown in Table 2.

Example 16

0.0046 g (65 ppm based on the total weight of the polymerizable composition) of zinc N,N-di-n-butyldithiocarbamate, 0.0140 g (200 ppm based on the total weight of the polymerizable composition, molar ratio of the compound of the general formula (2) to the compound of the general formula (1) of 4.7) of tributylbenzylammonium chloride, 0.105 g of an internal mold release agent (STEPAN Company, product name: Zelec UN) and 0.035 g of an ultraviolet absorber (Kyodo Chemical Co., Ltd., product name: viosorb 583) were mixed and dissolved in 38.0 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 32.0 g of 4-mercaptomethyl-1,8-dimercapto-3,6-dithiaoctane, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.622, Abbe number (ve) of 39, heat resistance (Tg) of 121 degree centigrade and color (YI) of 4.6. It was suitable as an optical transparent resin. The viscosity of the polymerizable composition measured after it was kept at 20 degree centigrade for 5 hours was 88 mPa·s. The evaluation results were shown in Table 2.

Example 17

0.0046 g (65 ppm based on the total weight of the polymerizable composition) of zinc N,N-di-n-butyldithiocarbamate, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 35.4 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 16.7 g of pentaerythritol tetrakis(3-mercaptopropionate) and 17.9 g of 4-mercaptomethyl-1,8-dimercapto-3,6-dithiaoctane in which 0.028 g (400 ppm based on the total weight of the polymerizable composition, molar ratio of the compound of the general formula (2) to the compound of the general formula (1) of 8.6) of tetrabutylphosphonium bromide was dissolved, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.597, Abbe number (ve) of 41, heat resistance (Tg) of 117 degree centigrade and color (YI) of 4.2. It was suitable as an optical transparent resin. The viscosity of the polymerizable composition measured after it was kept at 20 degree centigrade for 5 hours was 149 mPa·s. The evaluation results were shown in Table 2.

Example 18

0.0004 g (6 ppm based on the total weight of the polymerizable composition) of zinc N,N-di-n-butyldithiocarbamate, 0.0035 g (50 ppm based on the total weight of the polymerizable composition, molar ratio of the compound of the general formula (2) to the compound of the general formula (1) of 9.8) of trioctylmethylammonium chloride, 0.070 g of an internal mold release agent (STEPAN Company, product name: Zelec UN) and 0.035 g of an ultraviolet absorber (Kyodo Chemical Co., Ltd., product name: viosorb 583) were mixed and dissolved in 30.5 g of m-xylylene diisocyanate at 20 degree centigrade to give a homogeneous solution. To this homogeneous solution was added 39.5 g of pentaerythritol tetrakis(3-mercaptopropionate), and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 36, heat resistance (Tg) of 92 degree centigrade and color (YI) of 3.9. It was suitable as an optical transparent resin. The viscosity of the polymerizable composition measured after it was kept at 20 degree centigrade for 0.5 hours was 89 mPa·s. The evaluation results were shown in Table 2.

Example 19

0.0049 g (70 ppm based on the total weight of the polymerizable composition) of zinc N,N-di-n-butyldithiocarbamate, 0.0140 g (200 ppm based on the total weight of the polymerizable composition, molar ratio of the compound of the general formula (2) to the compound of the general formula (1) of 2.3) of trioctylmethylammonium chloride, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 34.8 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 18.1 g of a mixture of 17.1 g of pentaerythritol tetrakis(3-mercaptopropionate), 5,7-dimercaptomethyl-1,1'-dimercapto-3,6,9-trithiaundecane, 4,7-dimercaptomethyl-1,1'-dimercapto-3,6,9-trithiaundecane and 4,8-dimercaptomethyl-1,1'-dimercapto-3,6,9-trithiaundecane, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 130 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 41, heat resistance (Tg) of 125 degree centigrade and color (YI) of 4.3. It was suitable as an optical transparent resin. The viscosity of the polymerizable composition measured after it was kept at 20 degree centigrade for 5 hours was 102 mPa·s. The evaluation results were shown in Table 2.

Comparative Example 4

The operation was conducted in the same manner as in Example 8 without adding zinc N,N-di-n-butyldithiocarbamate. The viscosity of the polymerizable composition measured after it was kept at 20 degree centigrade for 5 hours was 36 mPa·s.

Comparative Example 5

The operation was conducted in the same manner as in Example 13 without adding zinc N,N-di-n-butyldithiocarbamate. The viscosity of the polymerizable composition measured after it was kept at 20 degree centigrade for 5 hours was 36 mPa·s.

Comparative Example 6

The operation was conducted in the same manner as in Example 14 without adding zinc N,N-di-n-butyldithiocarbamate. The viscosity of the polymerizable composition measured after it was kept at 20 degree centigrade for 5 hours was 35 mPa·s.

Comparative Example 7

The operation was conducted in the same manner as in Example 17 without adding zinc N,N-di-n-butyldithiocarbamate. The viscosity of the polymerizable composition measured after it was kept at 20 degree centigrade for 5 hours was 35 mPa·s.

Comparative Example 8

0.0056 g (80 ppm based on the total weight of the polymerizable composition) of di-n-butyltin dichloride, 0.070 g of an internal mold release agent (STEPAN Company, product name: Zelec UN) and 0.035 g of an ultraviolet absorber (Kyodo Chemical Co., Ltd., product name: viosorb 583) were mixed and dissolved in 30.5 g of m-xylylene diisocyanate at 20 degree centigrade to give a homogeneous solution. To this homogeneous solution was added 39.5 g of pentaerythritol tetrakis(3-mercaptopropionate), and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.598, Abbe number (ve) of 36, heat resistance (Tg) of 93 degree centigrade and color (YI) of 3.8. It was suitable as an optical transparent resin. The viscosity of the polymerizable composition measured after it was kept at 20 degree centigrade for 5 hours was 90 mPa·s. The evaluation results were shown in Table 2.

Comparative Example 9

0.024 g (300 ppm based on the total weight of the polymerizable composition) of di-n-butyltin dichloride, 0.084 g of an internal mold release agent (STEPAN Company, product name: Zelec UN) and 0.035 g of an ultraviolet absorber (Kyodo Chemical Co., Ltd., product name: viosorb 583) were mixed and dissolved in 34.8 g of a mixture of 2,5-bis(isocyanatomethyl)-bicyclo[2.2.1]heptane and 2,6-bis(isocyanatomethyl)-bicyclo[2.2.1]heptane at 20 degree centigrade to give a homogeneous solution. To this homogeneous solution was added a mixed solution of 18.1 g of a mixture of 17.1 g of pentaerythritol tetrakis(3-mercaptopropionate), 5,7-dimercaptomethyl-1,1'-dimercapto-3,6,9-trithiaundecane, 4,7-dimercaptomethyl-1,1'-dimercapto-3,6,9-trithiaundecane and 4,8-dimercaptomethyl-1,1'-dimercapto-3,6,9-trithiaundecane, and the mixture was mixed and dissolved at 20 degree centigrade. This mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 130 degree centigrade at which polymerization was conducted for 21 hours. After completion of polymerization, the mold was taken out from the oven and a resin was released from the mold. The obtained resin was additionally annealed at 130 degree centigrade for 4 hours. The obtained resin had transparency. Further, it had a refractive index (ne) of 1.599, Abbe number (ve) of 41, heat resistance (Tg) of 127 degree centigrade and color (YI) of 4.2. It was suitable as an optical transparent resin. The viscosity of the polymerizable composition measured after it was kept at 20 degree centigrade for 5 hours was 97 mPa·s. The evaluation results were shown in Table 2.

TABLE 2

| Example | Isocyanate compound (g) | Active hydrogen compound (g) | General formula (1) (ppm) note 3 (mmol) | General formula (2) (ppm) Note 4 | Catalytic activity (mPa · s) | Resin Transparency | Refractive index (ne) | Abbe number (ve) | Heat resistance (° C.) | Color YI |
|---|---|---|---|---|---|---|---|---|---|---|
| Example 8 | Mixture of 2,5-bis (isocyanato methyl)- | 4-mercapto methyl-1,8-dimercapto-3,6-dithia | ZnBTC (65) (0.0096) | TBAC (65) | 140 | ○ | 1.598 | 41 | 118 | 4.3 |

TABLE 2-continued

| Example | Isocyanate compound (g) | Active hydrogen compound (g) | General formula (1) (ppm) note 3 (mmol) | General formula (2) (ppm) Note 4 | Catalytic activity (mPa·s) | Resin Transparency | Refractive index (ne) | Abbe number (ve) | Heat resistance (°C.) | Color YI |
|---|---|---|---|---|---|---|---|---|---|---|
| | bicyclo [2.2.1] heptane and 2,6-bis (isocyanato methyl)- bicyclo[2.2.1] heptane (35.4) | octane (17.9) penta erythritol tetrakis (3-mercapto propionate) (16.7) | | | | | | | | |
| Example 9 | Mixture of 2,5-bis (isocyanato methyl)- bicyclo [2.2.1] heptane and 2,6-bis (isocyanato methyl)- bicyclo[2.2.1] heptane (35.4) | 4-mercapto methyl-1,8- dimercapto- 3,6-dithia octane (17.9) penta erythritol tetrakis (3-mercapto propionate) (16.7) | ZnBTC (50) (0.0074) | TBAB (400) | 180 | ○ | 1.598 | 41 | 119 | 4.1 |
| Example 10 | Mixture of 2,5-bis (isocyanato methyl)- bicyclo [2.2.1] heptane and 2,6-bis (isocyanato methyl)- bicyclo[2.2.1] heptane (35.4) | 4-mercapto methyl-1,8- dimercapto- 3,6-dithia octane (17.9) penta erythritol tetrakis (3-mercapto propionate) (16.7) | ZnBTC (50) (0.0074) | TBAFB (400) | 100 | ○ | 1.598 | 41 | 118 | 4.9 |
| Example 11 | Mixture of 2,5-bis (isocyanato methyl)- bicyclo [2.2.1] heptane and 2,6-bis (isocyanato methyl)- bicyclo[2.2.1] heptane (35.4) | 4-mercapto methyl-1,8- dimercapto- 3,6-dithia octane (17.9) penta erythritol tetrakis (3-mercapto propionate) (16.7) | ZnBTC (50) (0.0074) | TEAB (400) | 110 | ○ | 1.598 | 41 | 119 | 4.3 |
| Example 12 | Mixture of 2,5-bis (isocyanato methyl)- bicyclo [2.2.1] heptane and 2,6-bis (isocyanato methyl)- bicyclo[2.2.1] heptane (35.4) | 4-mercapto methyl-1,8- dimercapto- 3,6-dithia octane (17.9) penta erythritol tetrakis (3-mercapto propionate) (16.7) | FeETC (50) (0.0070) | TBAC (400) | 130 | ○ | 1.598 | 41 | 119 | 4.7 |
| Example 13 | Mixture of 2,5-bis (isocyanato methyl)- bicyclo [2.2.1] heptane and 2,6-bis (isocyanato methyl)- bicyclo[2.2.1] heptane (35.4) | 4-mercapto methyl-1,8- dimercapto- 3,6-dithia octane (17.9) penta erythritol tetrakis (3-mercapto propionate) (16.7) | ZnBTC (65) (0.0096) | TOMAC (95) | 80 | ○ | 1.597 | 41 | 117 | 4.2 |
| Example 14 | Mixture of 2,5-bis (isocyanato methyl)- bicyclo [2.2.1] heptane (17.9) | 4-mercapto methyl-1,8- dimercapto- 3,6-dithia octane | ZnBTC (65) (0.0096) | BTBAC (75) | 88 | ○ | 1.597 | 41 | 117 | 4.2 |

TABLE 2-continued

| Example | Isocyanate compound (g) | Active hydrogen compound (g) | General formula (1) (ppm) note 3 (mmol) | General formula (2) (ppm) Note 4 | Catalytic activity (mPa·s) | Resin Transparency | Refractive index (ne) | Abbe number (ve) | Heat resistance (° C.) | Color YI |
|---|---|---|---|---|---|---|---|---|---|---|
| | heptane and 2,6-bis (isocyanato methyl)- bicyclo[2.2.1] heptane (35.4) | penta erythritol tetrakis (3-mercapto propionate) (16.7) | | | | | | | | |
| Example 15 | m-xylylene diisocyanate (36.4) | 4-mercapto methyl-1,8-dimercapto-3,6-dithia octane (33.6) | ZnBTC (20) (0.0030) | TBAB (200) | 89 | ○ | 1.665 | 32 | 88 | 5.5 |
| Example 16 | Mixture of 2,5-bis (isocyanato methyl)- bicyclo [2.2.1] heptane and 2,6-bis (isocyanato methyl)- bicyclo[2.2.1] heptane (38.0) | 4-mercapto methyl-1,8-dimercapto-3,6-dithia octane (32.0) | ZnBTC (65) (0.0096) | BTBAC (200) | 88 | ○ | 1.622 | 39 | 121 | 4.6 |
| Example 17 | Mixture of 2,5-bis (isocyanato methyl)- bicyclo [2.2.1] heptane and 2,6-bis (isocyanato methyl)- bicyclo[2.2.1] heptane (35.4) | 4-mercapto methyl-1,8-dimercapto-3,6-dithia octane (17.9) penta erythritol tetrakis (3-mercapto propionate) (16.7) | ZnBTC (65) (0.0096) | TBPB (400) | 149 | ○ | 1.597 | 41 | 117 | 4.2 |
| Example 18 | m-xylylene diisocyanate (30.5) | penta erythritol tetrakis (3-mercapto propionate) (39.5) | ZnBTC (6) (0.0009) | TOMAC (50) | 89 | ○ | 1.598 | 36 | 92 | 3.9 |
| Example 19 | Mixture of 2,5-bis (isocyanato methyl)- bicyclo [2.2.1] heptane and 2,6-bis (isocyanato methyl)- bicyclo[2.2.1] heptane (34.8) | Mixture of 5,7-dimercapto methyl-1,11-dimercapto-3,6,9-trithia undecane, 4,7-dimercapto methyl-1,11-dimercapto-3,6,9-trithia undecane and 4,8-dimercapto methyl-1,11-dimercpato-3,6,9-trithia undecane (18.1) | ZnBTC (70) (0.0103) | TOMAC (200) | 102 | ○ | 1.598 | 41 | 125 | 4.3 |
| Comparative Example 8 | m-xylylene diisocyanate (30.5) | penta erythritol tetrakis (3-mercapto propionate) (39.5) | DBC (80) (0.0184) | — | 90 | ○ | 1.598 | 36 | 93 | 3.8 |
| Comparative Example 9 | Mixture of 2,5-bis (isocyanato methyl)- bicyclo [2.2.1] heptane, | Mixture of 5,7-dimercapto methyl-1,11-dimercapto-3,6,9-trithia undecane, | DBC (300) (0.0691) | — | 97 | ○ | 1.599 | 41 | 127 | 4.2 |

TABLE 2-continued

| Example | Isocyanate compound (g) | Active hydrogen compound (g) | General formula (1) (ppm) note 3 (mmol) | General formula (2) (ppm) Note 4 | Catalytic activity (mPa·s) | Resin Transparency | Refractive index (ne) | Abbe number (ve) | Heat resistance (°C.) | Color YI |
|---|---|---|---|---|---|---|---|---|---|---|
| | heptane and 2,6-bis (isocyanato methyl)- bicyclo[2.2.1] heptane (34.8) | 4,7-dimercapto methyl-1,11-dimercapto-3,6,9-trithia undecane and 4,8-dimercapto methyl-1,11-dimercpato-3,6,9-trithia undecane (18.1) | | | | | | | | |

Notes 3 and 4:
The amount (ppm) of the compound of the general formula (1) and the compound of the general formula (2) added is a value based on the total weight of the polymerizable composition.
ZnBTC: zinc N,N-di-n-butyldithiocarbamate
FeETC: iron N,N-diethyldithiocarbamate
TBAC: tetrabutylammonium chloride
TBAB: tetrabutylammonium bromide
TBAFB: tetrabutylammonium tetrafluoroborate
TEAB: tetraethylammonium bromide
TOMAC: trioctylmethylammonium chloride
BTBAC: tributylbenzylammonium chloride
TBPB: tetrabutylphosphonium chloride
DBC: di-n-butyltin dichloride From the above results, the polymerizable composition of the present invention using the compound of the general formula (1) and the compound of the general formula (2) together exhibits catalytic activity equal to or superior to that of the di-n-butyltin dichloride catalyst of Comparative Examples by using the compound of the general formula (1) in a very small amount, while the polythiourethane resin which can be suitably used as an optical transparent resin by heat curing is obtained.

Furthermore, FIG. 1 illustrates the time course of the viscosity of the polymerizable composition obtained by Examples 8, 13, 14, 17 and Comparative Examples 3 to 7. As shown in FIG. 1, the polymerizable composition of the present invention exhibits catalytic activity higher than the viscosity measured after it is kept at 20 degree centigrade for 5 hours. On the other hand, a sufficient pot life is also secured. During injection into a mold, it is possible to inject the composition into the mold before the polymerization reaction is progressed without resulting in excessively high viscosity.

From the above results, the catalytic activity per mole of the catalyst of the present invention is high as compared to that of the organotin catalyst of Comparative Examples, and weather resistance of the obtained polythiourethane optical material is also excellent. A catalyst for the production of polythiourethane optical materials can be sufficiently used as a tin free catalyst instead of the organotin catalyst that has been used from the past.

The invention claimed is:

1. A polymerizable composition for polythiourethane optical materials comprising:
   zinc di-n-butyldithiocarbamate or zinc dimethyldithiocarbamate,
   m xylylene diisocyanate, and
   4-mercaptomethyl-1,8-dimercapto-3,6-dithiaoctane,
   wherein the polymerizable composition does not contain an organotin catalyst.

2. The polymerizable composition for polythiourethane optical materials according to claim 1, comprising zinc dimethyldithiocarbamate, m xylylene diisocyanate, and 4-mercaptomethyl-1,8-dimercapto-3,6-dithiaoctane.

3. A polythiourethane optical material obtained by curing the polymerizable composition for polythiourethane optical materials according to claim 2.

4. A plastic lens comprising the polythiourethane optical material according to claim 3.

5. A polythiourethane optical material obtained by curing the polymerizable composition for polythiourethane optical materials according to claim 1.

6. A plastic lens comprising the polythiourethane optical material according to claim 5.

7. A process for producing a polythiourethane optical material, wherein the polymerizable composition for polythiourethane optical materials according to claim 1 is subjected to casting polymerization.

8. A polymerizable composition for polythiourethane optical materials comprising:
   zinc di-n-butyldithiocarbamate,
   m xylylene diisocyanate, and
   a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane,
   wherein the polymerizable composition does not contain an organotin catalyst.

9. A polythiourethane optical material obtained by curing the polymerizable composition for polythiourethane optical materials according to claim 8.

10. A plastic lens comprising the polythiourethane optical material according to claim 9.

11. A polymerizable composition for polythiourethane optical materials comprising:

zinc di-n-butyldithiocarbamate,
a mixture of 2,5-bis(isocyanatomethyl)-bicyclo[2.2.1]heptane and 2,6-bis(isocyanatomethyl)-bicyclo[2.2.1]heptane and
a mixture of 4-mercaptomethyl-1,8-dimercapto-3,6-dithiaoctane and pentaerythritol tetrakis(3-mercaptopropionate),
wherein the polymerizable composition does not contain an organotin catalyst.

12. The polymerizable composition for polythiourethane optical materials according to claim 11, further comprising tetrabutylammonium chloride.

13. The polymerizable composition for polythiourethane optical materials according to claim 11, further comprising tetrabutylammonium bromide.

14. A polythiourethane optical material obtained by curing the polymerizable composition for polythiourethane optical materials according to claim 12.

15. A plastic lens comprising the polythiourethane optical material according to claim 14.

16. A polythiourethane optical material obtained by curing the polymerizable composition for polythiourethane optical materials according to claim 13.

17. A plastic lens comprising the polythiourethane optical material according to claim 16.

18. A polythiourethane optical material obtained by curing the polymerizable composition for polythiourethane optical materials according to claim 11.

19. A plastic lens comprising the polythiourethane optical material according to claim 18.

20. A polymerizable composition for polythiourethane optical materials comprising:

a catalyst which is zinc N-ethyl-N-phenyldithiocarbamate;
an isocyanate compound which is m-xylylene diisocyanate; and
an active hydrogen compound which is 4-mercaptomethyl-1,8-dimercapto-3,6-dithiaoctane,
wherein the polymerizable composition does not contain an organotin catalyst.

21. A polythiourethane optical material obtained by curing the polymerizable composition for polythiourethane optical materials according to claim 20.

22. A plastic lens comprising the polythiourethane optical material according to claim 21.

23. A process for producing a polythiourethane optical material, wherein the polymerizable composition for polythiourethane optical materials according to claim 8 is subjected to casting polymerization.

24. A process for producing a polythiourethane optical material, wherein the polymerizable composition for polythiourethane optical materials according to claim 11 is subjected to casting polymerization.

25. A process for producing a polythiourethane optical material, wherein the polymerizable composition for polythiourethane optical materials according to claim 12 is subjected to casting polymerization.

26. A process for producing a polythiourethane optical material, wherein the polymerizable composition for polythiourethane optical materials according to claim 13 is subjected to casting polymerization.

27. A process for producing a polythiourethane optical material, wherein the polymerizable composition for polythiourethane optical materials according to claim 20 is subjected to casting polymerization.

* * * * *